United States Patent [19]

Kumura et al.

[11] Patent Number: 4,576,265

[45] Date of Patent: Mar. 18, 1986

[54] CONTROL SYSTEM FOR HYDRAULIC AUTOMATIC CLUTCH

[75] Inventors: Haruyoshi Kumura; Yoshikazu Tanaka, both of Yokohama; Keiju Abo; Hiroyuki Hirano, both of Yokosuka; Sigeaki Yamamuro, Zushi, all of Japan

[73] Assignee: Nissan Motor Co., Ltd., Yokohama, Japan

[21] Appl. No.: 543,838

[22] Filed: Oct. 20, 1983

[30] Foreign Application Priority Data

Oct. 22, 1982 [JP] Japan .................................. 57-184627
Mar. 14, 1983 [JP] Japan .................................. 58-40808
Apr. 22, 1983 [JP] Japan .................................. 58-70095
May 27, 1983 [JP] Japan .................................. 58-92418

[51] Int. Cl.[4] ............................................. B60K 41/28
[52] U.S. Cl. ................................ 192/0.055; 192/0.094; 192/103 R; 192/0.044
[58] Field of Search ............... 192/0.032, 0.055, 0.044, 192/0.094, 0.076, 0.075, 103 R, 4 A, 3.58; 74/866, 867, 868, 869, 877, 878

[56] References Cited

U.S. PATENT DOCUMENTS

| | | | |
|---|---|---|---|
| 3,004,447 | 10/1961 | Sand | 74/868 |
| 4,295,551 | 10/1981 | Zimmerman et al. | 192/0.076 |
| 4,393,964 | 7/1983 | Kemper | 192/0.076 |
| 4,459,878 | 7/1984 | Frank | 74/866 |
| 4,487,303 | 12/1984 | Boueri et al. | 192/0.076 |

OTHER PUBLICATIONS

"Kikai Kogaku Binran", Japan, 7-58 and 7-59, issued in 1950.

Primary Examiner—George H. Krizmanich
Attorney, Agent, or Firm—Schwartz, Jeffery, Schwaab, Mack, Blumenthal & Evans

[57] ABSTRACT

The control system comprises a starting valve wherein an engine revolution speed indicative fluid pressure and a start adjustment fluid pressure act on a spool of the valve against each other. The starting valve generates a start pressure to be used as a clutch engagement pressure for a hydraulic clutch. The start adjustment fluid pressure is generated by a start adjustment valve coupled with an electronic control unit. Under the control of the electronic control unit, the start adjustment offsets a variation in the engine revolution fluid pressure when the engine idles with the vehicle at a standstill.

13 Claims, 34 Drawing Figures

TO STEP 601 OF FIG. 5(a)

|   | A | B | C | D |
|---|---|---|---|---|
| 317 a | H | L | L | H |
| 317 c | H | H | L | L |
| 317 b | L | H | H | L |
| 317 d | L | L | H | H |

→ UPSHIFT
← DOWNSHIFT

TO STEP 601 OF FIG.5(a)

TO STEP 601 OF FIG. 5(a)

TO STEP 601 OF FIG. 5(a)

1

CONTROL SYSTEM FOR HYDRAULIC AUTOMATIC CLUTCH

CROSS REFERENCE TO RELATED APPLICATIONS

Reference is made to the co-pending U.S. patent application Ser. No. 489,600 filed Apr. 28, 1983. Reference is also made to the following related co-pending U.S. patent applications, each filed by the same applicants concurrently with the present application: U.S. patent application Ser. No. 544,071, U.S. patent application Ser. No. 543,839, U.S. patent application Ser. No. 544,066, and U.S. patent application Ser. No. 543,840.

BACKGROUND OF THE INVENTION

The present invention relates to a control system for a hydraulic automatic clutch.

In the case of a vehicle having a hydraulic automatic clutch, the engagement of the clutch is controlled by a fluid pressure supplied thereto. During idling operation of an engine when the vehicle is at a standstill, the fluid pressure supplied to the clutch is kept low enough to assure disengagement of the clutch. For starting the vehicle, the fluid pressure supplied to the clutch is increased in accordance with an input revolution speed, for example, an engine revolution speed, to the clutch in order to engage the clutch. This control concept of the automatic clutch has the following problem. Although the fluid pressure supplied to the clutch during idling of the engine when the vehicle is at a standstill must be suffciently low to assure disengagement of the clutch, if the fluid pressure supplied to the clutch is set excessively low as compared to a certain value at which the clutch begins to engage, it takes a time and allows the engine to race before the clutch starts engaging. If, on the other hand, the fluid pressure supplied to the clutch is adjusted to a slightly low value as compared to the certain value, the fluid pressure supplied to the clutch will exceed the certain value when the idle speed of the engine increases as a result of the use of a choke or the use of a compressor of an air conditioner or the irregular operation of the engine, resulting in an unintentional starting of the vehicle. To avoid such problem, it has been the common practice to set the fluid pressure supplied to the clutch during idling of the engine when the vehicle is at a standstill sufficiently lower than the value at which the clutch engagement initiates. As a result, it has been recognized as an unavoidable operational characteristic of the hydraulic automatic clutch that the engine tends to race prior to clutch engagement and there take place substantial shocks upon clutch engagement for starting the vehicle.

SUMMARY OF THE INVENTION

According to the present invention, a control system for a hydraulic automatic clutch comprises:

a hydraulic clutch;

an engine revolution means for generating an engine revolution fluid pressure signal indicative of a revolution speed of the engine;

a start adjustment valve means for generating a start adjustment fluid pressure signal in response to an electric signal;

a starting valve means coupled with the engine revolution means and the start adjustment valve means for generating a start fluid pressure, the start fluid pressure being supplied to the clutch to engage same;

an electronic control unit means for controlling the electric signal to keep the clutch in a predetermined state regardless of a variation in the engine revolution fluid pressure signal when the engine idles with the vehicle at a standstill.

An object of the present invention is to provide a control system for a hydraulic automatic clutch which provides a stable starting of the vehicle free from engine racing and/or occurrence of shocks and/or unintentional starting of the vehicle.

DETAILED DESCRIPTION OF THE INVENTION

Referring to FIGS. 1 through 21, a first embodiment of a control system for a hydraulic automatic clutch according to the present invention is described.

Figure 1:
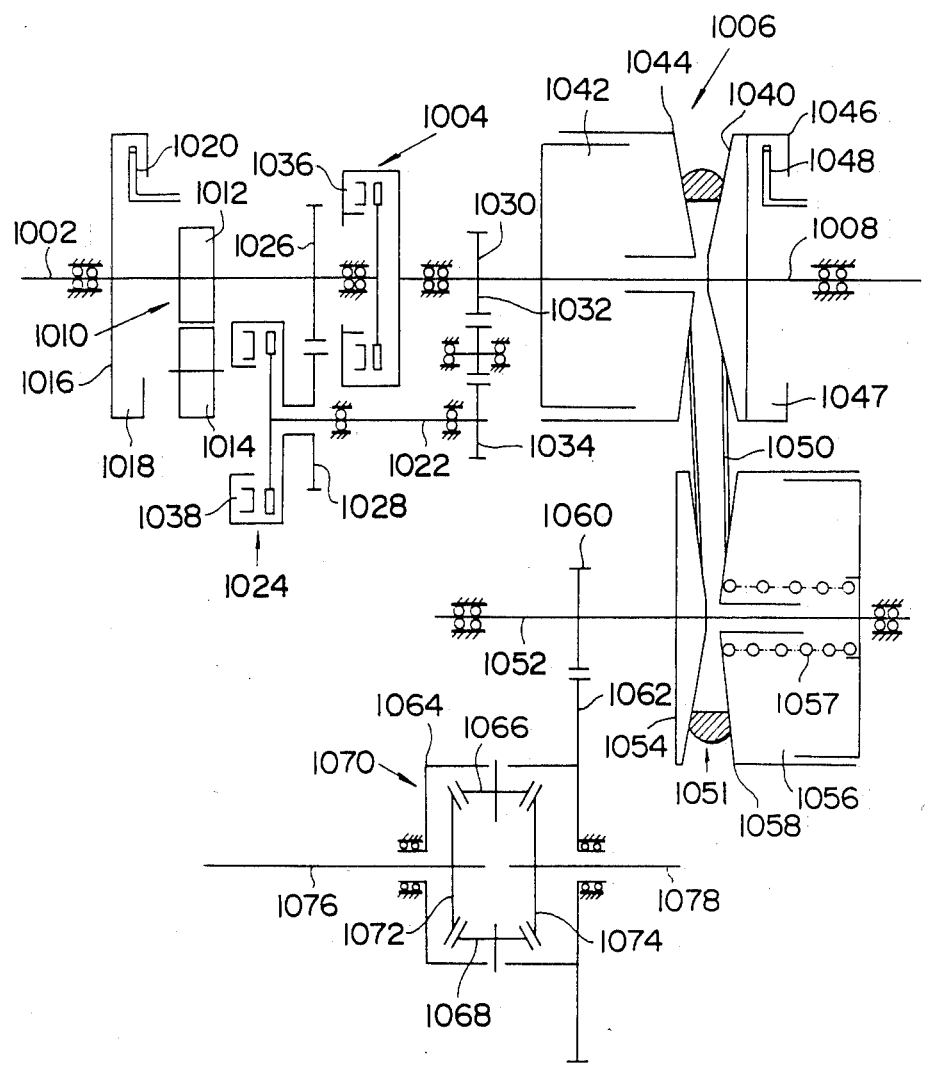
FIG. 1 is a diagrammatic view of a transmission mechanism of a continuously variable V-belt transmission including a hydraulic automatic clutch according to the present invention.
Figure 2A:
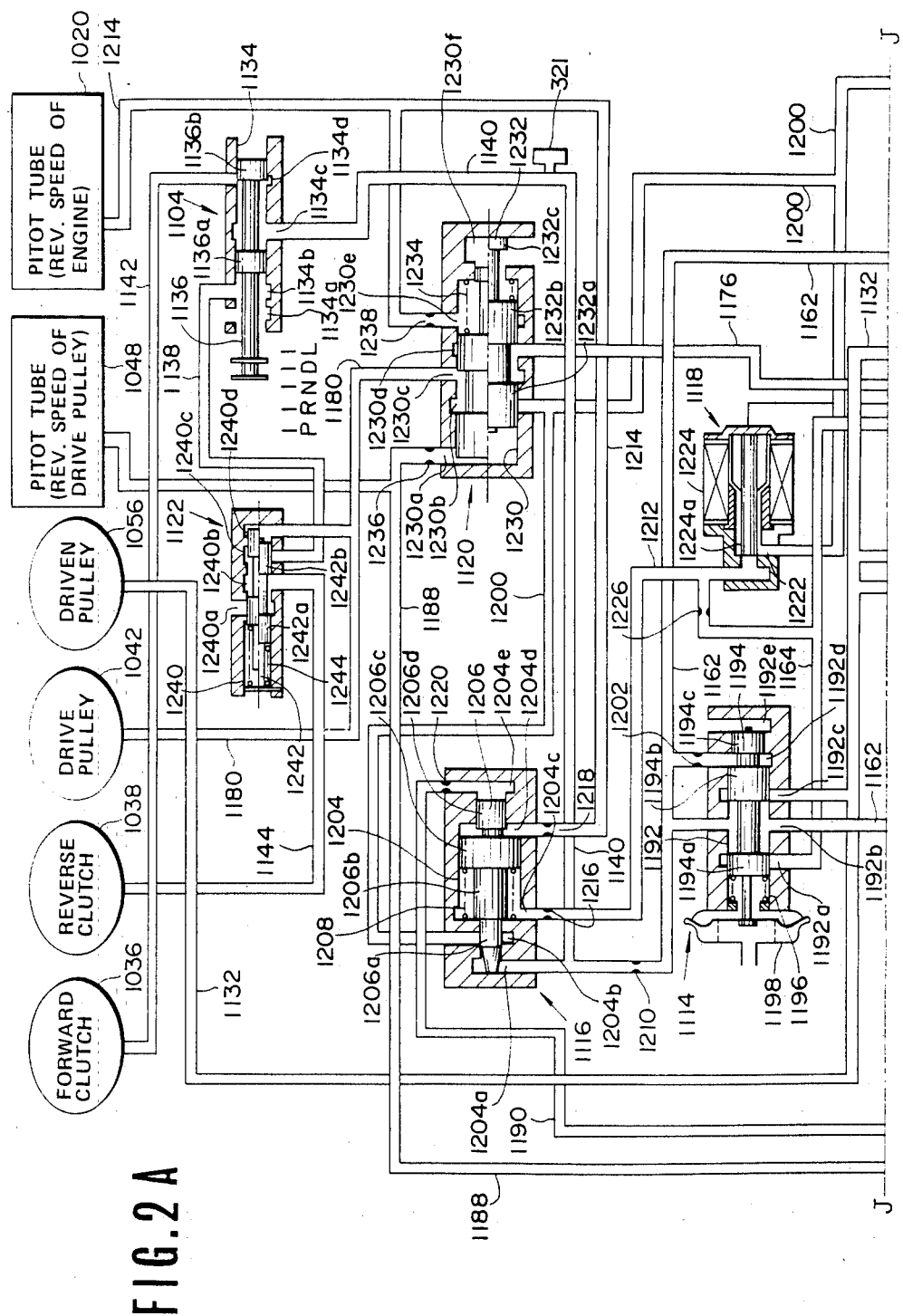
FIGS. 2A and 2B, when combined, illustrate a hydraulic control system, including a control system for the automatic clutch, for the continuously variable V-belt transmission.

Referring to FIG. 1, a power trasnmission mechanism of a continuously variable V-belt transmission of an automotive vehicle is shown. An input shaft 1002 is driven by an engine having a throttle valve. The input shaft 1002 is connectable with a drive pulley 1006 via a hydraulic forward clutch 1004 for forward drive of the vehicle or via a hydraulic reverse clutch 1024 for reverse drive. The forward clutch 1004 and the reverse clutch 1024 are wet type multiple plate clutches which are well known and shown in FIG. 120 on Page 7-59 of Chapter 7 of "Kikai Kogaku Binran" issued in 1950. The clutch 1004 has a cylinder chamber 1036 and starts engaging when a fluid pressure, i.e., an oil pressure, supplied to the cylinder chamber 1036 exceeds a predetermined value. The reverse clutch 1024 has a cylinder chamber 1038 and starts engaging when a fluid pressure, i.e., an oil pressure, supplied to the cylinder chamber 1038 exceeds a predetermined value. As shown in FIG. 2A, the forward clutch cylinder chamber 1036 is connected with a manual valve 1104 via an oil conduit 1142, while the reverse clutch cylinder chamber 1038 is connected with the manual valve 1104 via an oil conduit 1144, a reverse inhibitor valve 1122 and an oil conduit 1138. The manual valve 1104 admits an oil pressure in an oil conduit 1140 to the forward cylinder chamber 1036 when it is set in a "D" (forward drive) position, while it admits the oil pressure in the oil conduit 1140 to the reverse cylinder chamber 1038 when it is set in a "R" (reverse) position. The oil pressure in the oil conduit 1140 is generated by a starting valve 1116. The starting valve 1116 is responsive to an oil pressure in an oil conduit 1214 indicative of an engine revolution speed and a start adjustment oil pressure in an oil conduit 1212, generated by a start adjustment valve 1118 including a force motor 1224.

Figure 2B:
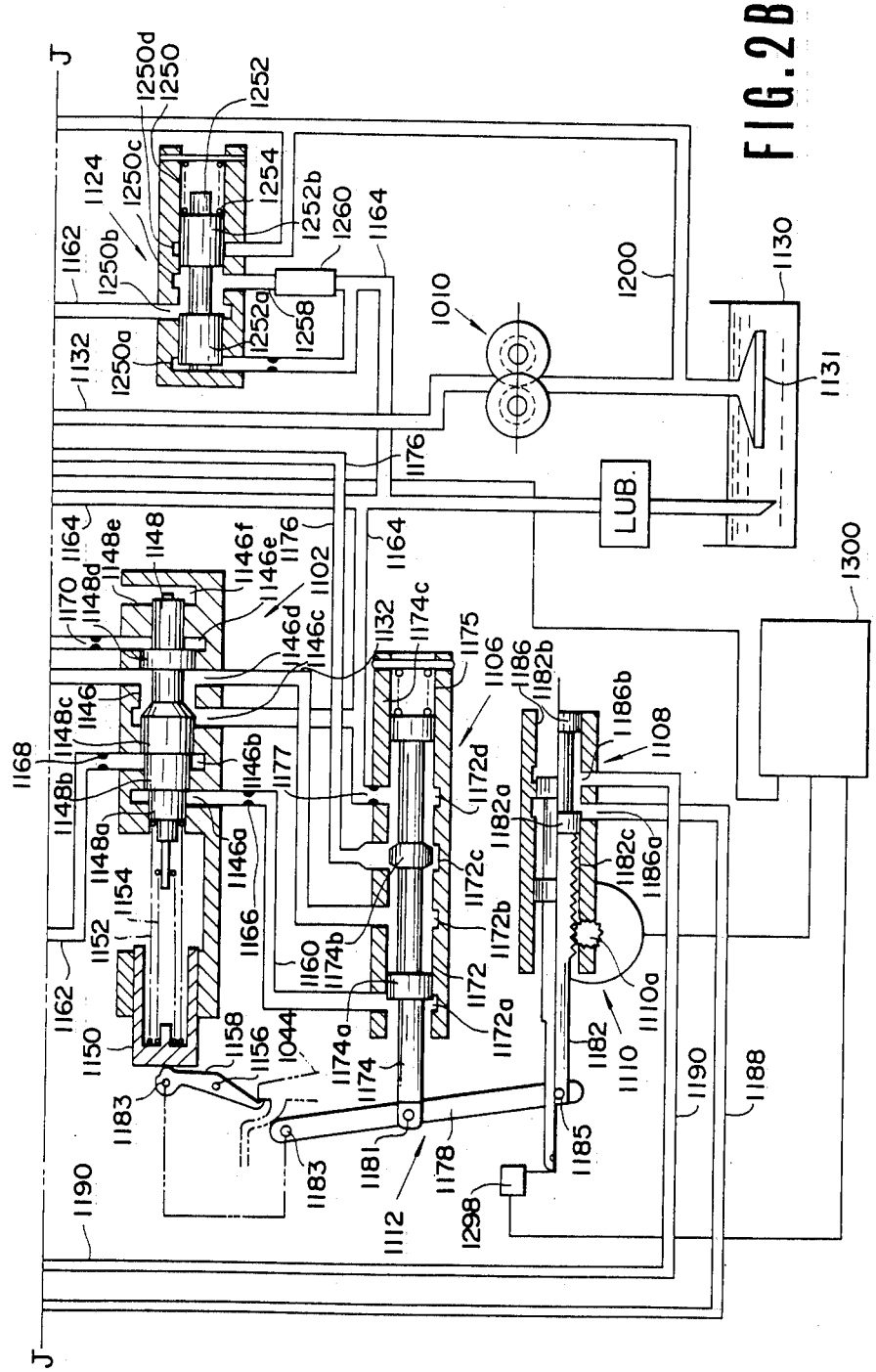
Figure 24:
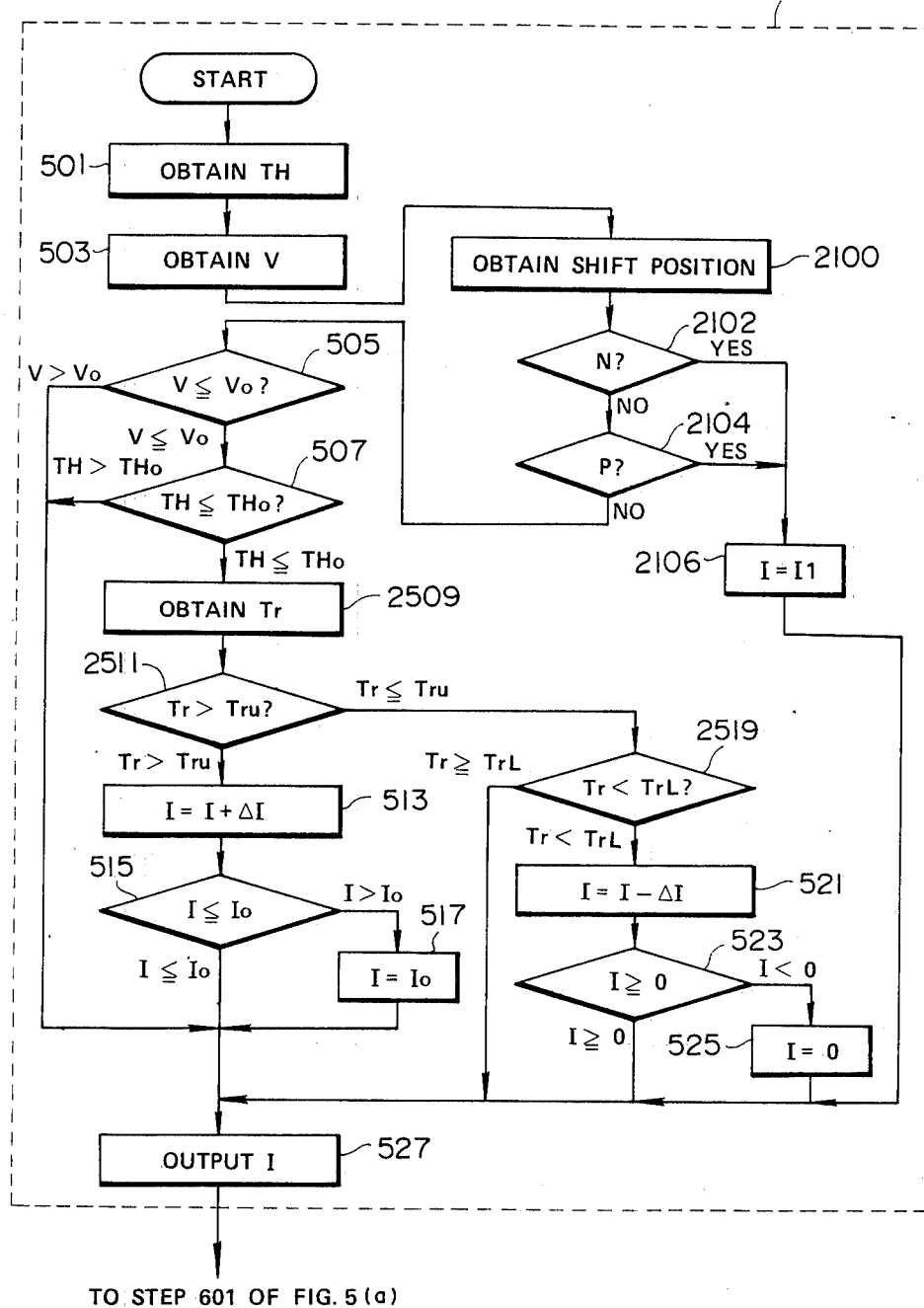
FIG. 24 is a flow chart of a force motor control routine 500A used in the second embodiment.
Figure 25A:
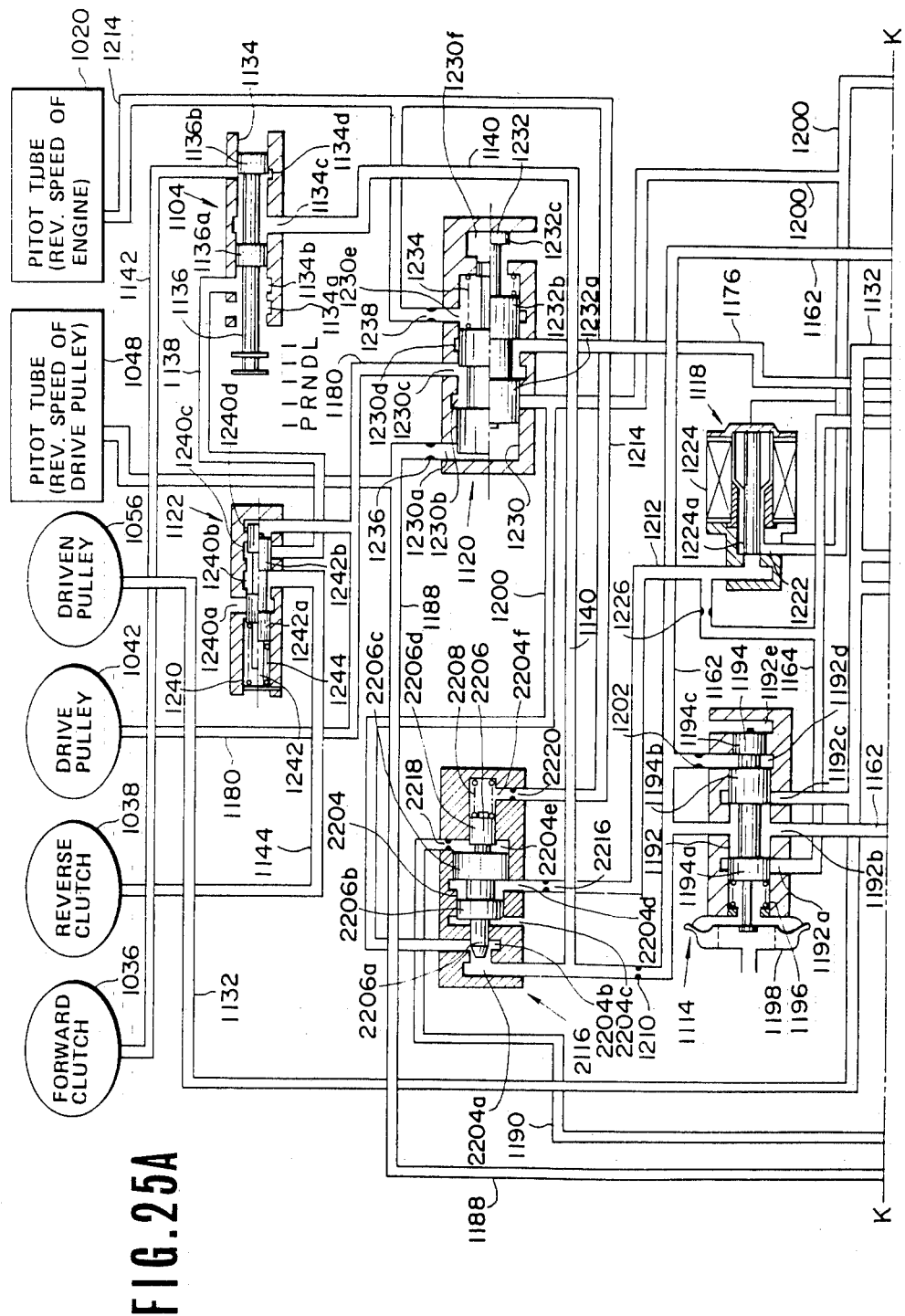
FIGS. 25A and 25B are similar views to FIGS. 2A and 2B, respectively, and illustrate a hydraulic control system including a third embodiment according to the present invention.
Figure 25B:
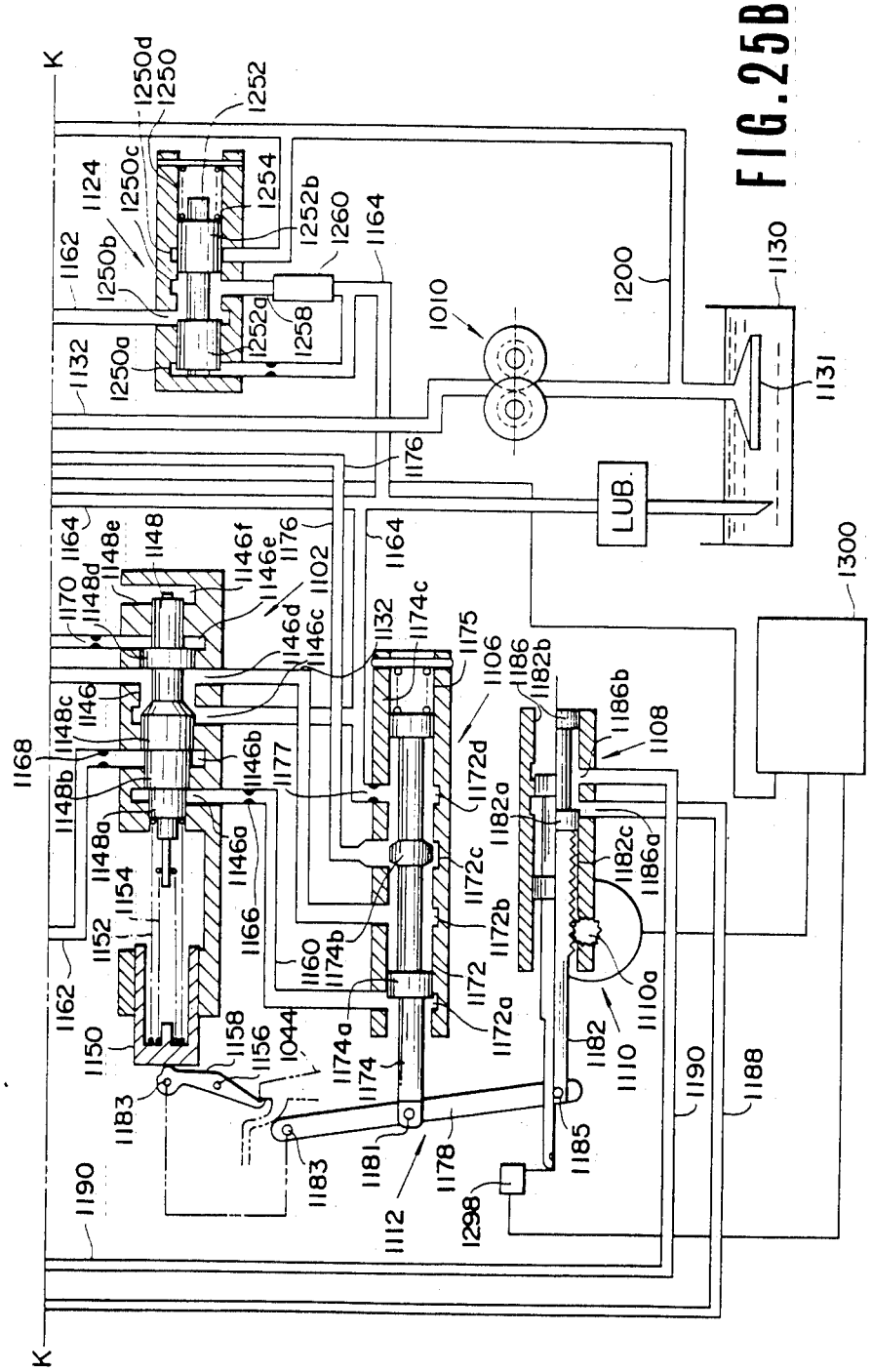
Figure 26:
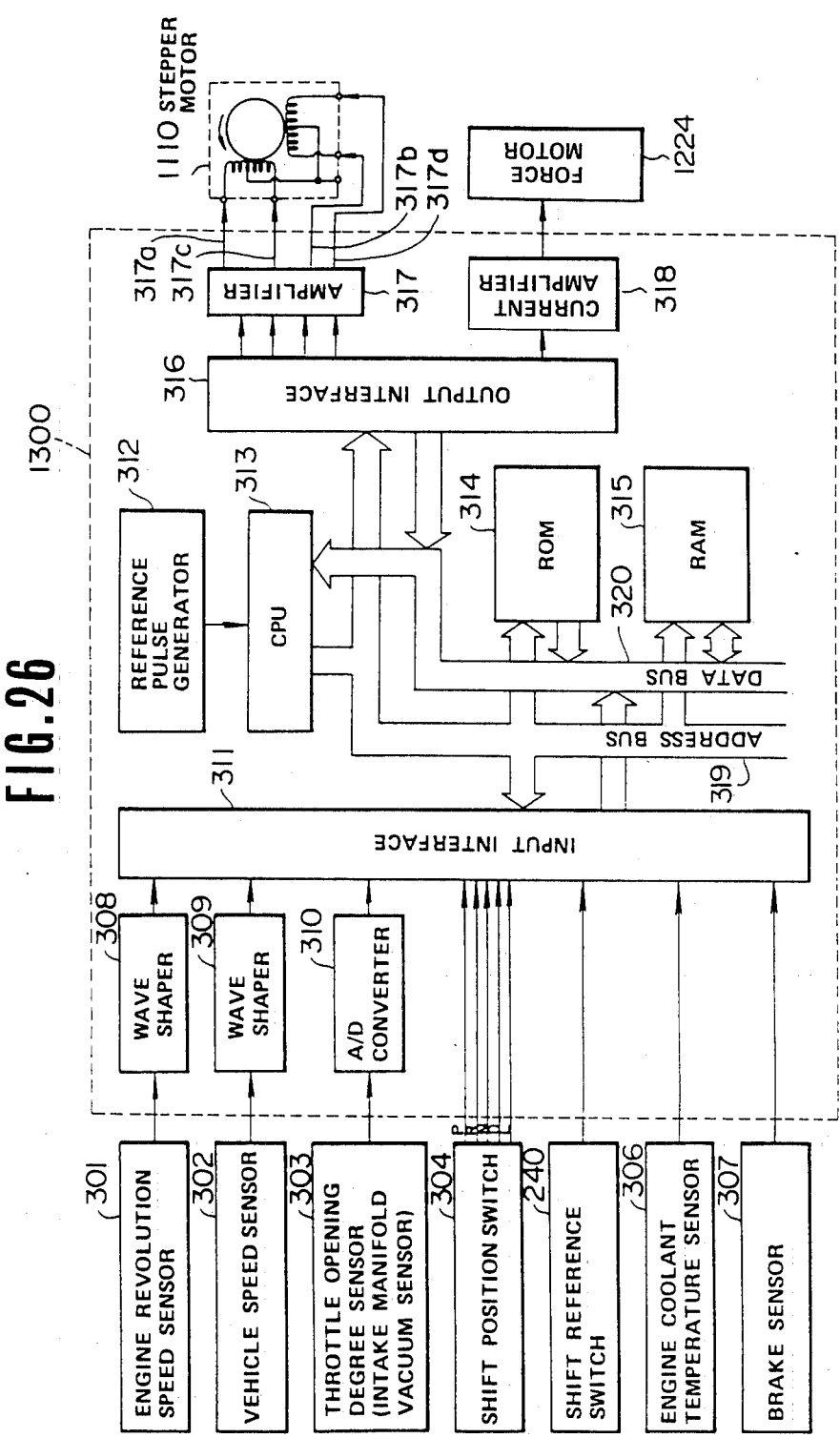
FIG. 26 is a similar view to FIG. 3 showing an electronic control unit used in the third embodiment.

The detailed description of FIGS. 1 and FIGS. 2A, 2B is found in a co-pending U.S. patent application Ser. No. 489,600 filed Apr. 28, 1983 (see FIGS. 24 and 25A, 25B) by the same applicants and commonly assigned herewith. That portion of the disclosure of this co-pending application which relates to FIGS. 24, 25A and 25B is hereby incorporated by reference in its entirety.

Next, an explanation is made regarding a shift control unit or an electronic control unit 1300 which controls actuation of a shift motor or a stepper motor 1110 and a force motor 1224.

Figure 3:
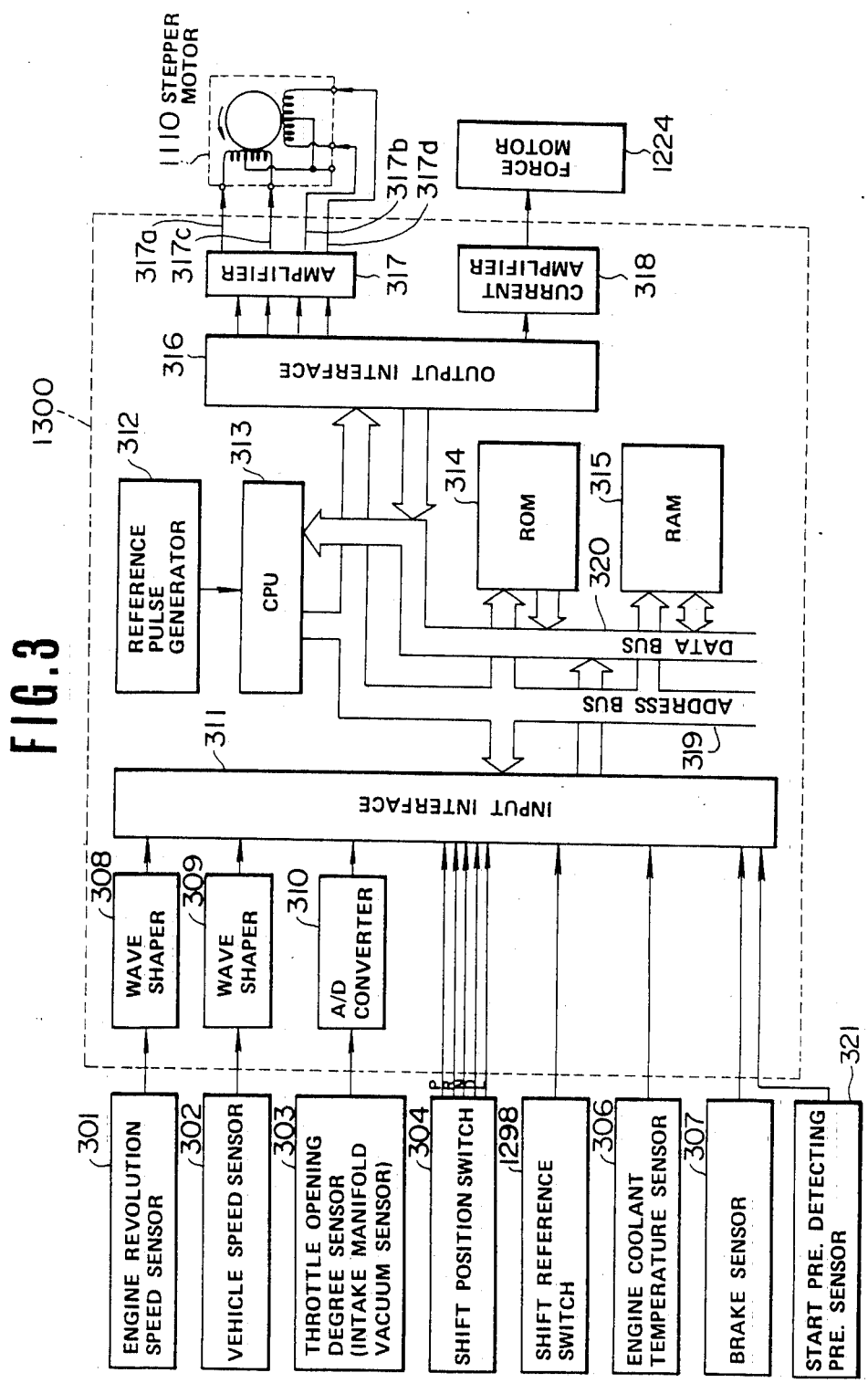
FIG. 3 is a block diagram showing an electronic control unit 1300 for controlling a stepper motor 1110 and a force motor 1224 shown in FIGS. 2A and 2B.

As shown in FIG. 3, the shift control unit 1300 receives as inputs thereto electric signals from an engine revolution speed sensor 301, a vehicle speed sensor 302, a throttle opening degree sensor (or an intake manifold vacuum sensor) 303, a shift position switch 304, a shift reference switch 1298, an engine coolant temperature sensor 306, a brake sensor 307, and a start pressure detecting pressure sensor 321. The engine revolution speed sensor 301 detects an engine revolution speed by measuring the number of ignition spark pluses of the engine, and the vehicle speed sensor 302 detects a vehicle speed by measuring the revolution of the output shaft of the continuously variable transmission. The throttle opening degree sensor (or intake manifold vacuum sensor) 303 detects the engine throttle opening degree in terms of an electric voltage signal (in the case of the intake manifold vacuum sensor, the intake manifold vacuum is detected in terms of an electric voltage signal). The shift position switch 304 detects which one of range positions, namely, P, N, D, and L, the before mentioned manual valve 1104 assumes. The shift reference switch 1298 is turned on when the sleeve 1182 of the before mentioned shift operating mechanism 1108 has come to a position corresponding to the largest reduction ratio. The engine coolant temperature 306 generates a signal when the engine coolant temperature is lower than a predetermined value. The brake sensor 307 detects whether or not the vehicle brake is used. The start pressure detecting pressure sensor 321 converts the start pressure in the above mentioned oil conduit 1140 into an electric signal. The signals generated by the engine revolution speed sensor 301 and vehicle speed sensor 302 are sent to an input interface 311 after passage through wave shapers 308 and 309, respectively, and the electric voltage from the throttle opening degree sensor (or intake manifold vacuum sensor) 303 is converted at an A/D converter 310 into a digital signal before being sent to the input interface 311. The electronic control unit 1300 includes the input interface 311, a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. The reference pulse generator 312 generates a reference pulse which actuates the CPU 313. The ROM 314 stores programs necessary for controlling the stepper motor 1110 and force motor 1224 and data necessary for controlling them. The RAM stores various parameters necessary for processing information from each of the sensors and switches and those necessary for control. Output signals from the shift control apparatus 1300 are sent out to the stepper motor 1110 and force motor 1224 via an amplifier 317 and an electric current amplifier 318, respectively.

Hereinafter, a concrete explanation is made regarding the content of control carried out in the control unit 1300 in controlling the stepper motor 1110 and force motor 1224.

The control may be divided into a force motor control routine 500, a complete engagement control routine 600 and a stepper motor control routine 700.

Figure 4:
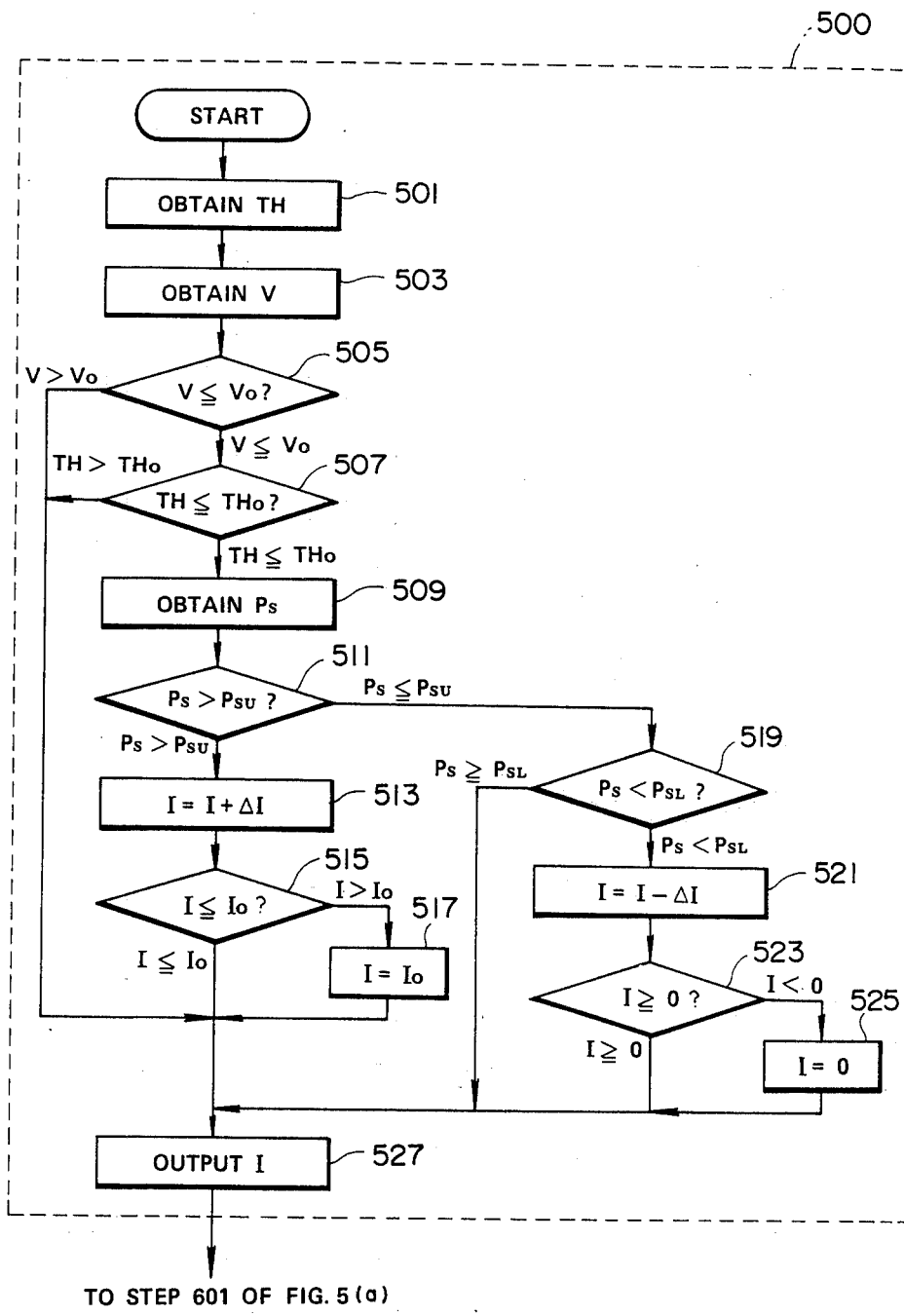
FIG. 4 is flow chart of a force motor control routine 500 of the control system for the automatic clutch.

First, the control of the force motor 1224 is described. The force motor control routine 500 is shown in FIG. 4. With the force motor control routione 500, the start pressure Ps is controlled by the start adjustment valve 1118 and starting valve 116 when the engine idles in order to put the forward clutch 1004 (or the reverse clutch 1024) in a predetermined state, such as, in a state right before initiation of the clutch engagement. This force motor control routine 500 is executed after a predetermined period of time (i.e., the execution of the following routine is repeated within a short period of time). Explaining along the steps, a throttle opening degree TH is obtained from the throttle opening degree sensor 303 (in step 501), and a vehicle speed V is obtained from the vehicle speed sensor 302 (in step 503). Then, in step 505, a determination is made whether the vehicle speed V is less than or equal to a predetermined small value Vo or not. If it is less than or equal to the predetermined value Vo or not, a determination is made in step 507 whether the throttle opening degree TH is less than or equal to a predetermined small value THo or not. If it is less than the predetermined value THo (i.e., in the case when the vehicle is at a standstill with the engine idling), the program goes to a step 509 wherein a start pressure Ps is obtained from the start pressure detecting pressure sensor 321. If the vehicle speed V is greater than the predetermined value Vo in step 505 or the throttle opening degree TH is greater than the predetermined value THo in step 507, the program goes to step 527 wherein the same electric current signal for the force motor 1224 as that in the previous routine is sent out, i.e., the electric signal given at the instance immediately before the vehicle speed V has become greater than the predetermined value Vo or the throttle opening degree TH has become greater than the predetermined value THo. After obtaining a start pressure Ps in step 509, the program goes to a step 511 wherein a determination is made whether the start pressure Ps is greater than a desired pre-engagement start pressure upper limit value Psu. If Ps is greater than Psu, the force motor electric current signal I is increased by a predetermined small value ΔI (in step 513). Then, a determination is made whether the electric signal I is less than or equal to a maximum allowable electric signal value Io (in step 515). If I is less than or equal to Io, the program goes to the step 527, while if I is greater than Io, I is given Io (in step 517) and the program goes to the step 527. In the step 527, the force motor electric signal I is sent out. If, in step 511, Ps is less than or equal to Psu, a determination is made whether the start pressure Ps is less than a desired pre-engagement start pressure lower limit value PsL (in step 519). If Ps is greater than or equal to PsL (if combined with the determination made in the step 511, this is the case where Ps is greater than or equal to PsL but less than or equal to Psu. That is, the start pressure Ps is disposed between the upper and lower limit values.), the step 527 is executed to sent out the electric signal obtained in the previous routine. If, in step 519, Ps is less than PsL, the force motor electric signal I is decreased by the small value ΔI (in step 521). For preventing the electric signal I from becoming zero, a determination is made whether I is greater than or equal to zero or not (in step 523). If I is greater than or equal to zero, the program goes directly to the step 527, while if I is less than zero, the program goes to a step 525 where I is given zero, and then goes to the step 527. In the step 527, the electric signal I is sent out. What is done by the execution of the above mentioned steps is to increase the force motor electric signal I if the start pressure Ps is greater than the upper limit value Psu so as to decrease the start pressure Ps, or to decrease the force motor electric signal I if the start pressure Ps is less than the lower limit value PsL so as to increase the start pressure Ps. Therefore, the start pressure Ps is maintained between the upper and lower limit values Psu and PsL. The desired pre-engagement start pressure is set at a predetermined value right below a value at which the forward clutch 1004 (or the reverse clutch 1024) starts engaging. Accordingly, if the engine revolution speed increases from the idle speed, the start pressure Ps is elevated, by the action of the starting valve 1116, to a value which is the sum of the desired pre-engagement start pressure and an oil pressure corresponding to an increase in the engine revolution speed, causing engagement of the forward clutch 1004 (or the reverse clutch 1024) to start the vehicle. By virtue of the above mentioned control, stable starting operation of the vehicle is assured without the occurrence of an engine racing nor an unintentional starting of the vehicle. This is because the start pressure is controlled to become the desired pre-engagement start pressure irrespective of the variation in the idle speed which is subject to deviation from a set value due to the use of a choke or the use of an air compressor of an air conditioner or the irregular operation of the engine.

If desired, the desired pre-engagement start pressure may be set at a value at which the clutch slightly engages to transmit a small torque. As long as the torque is small, no problem is raised. If the desired pre-engagement start pressure is so set, the racing of the engine can be effectively prevented. Such setting of the desired start pressure does not create any practical problem unless an unnecessary heavy load is applied on the engine to increase its speed because the start adjustment valve 1118 prevents an unintentional starting of the vehicle.

Figure 5:
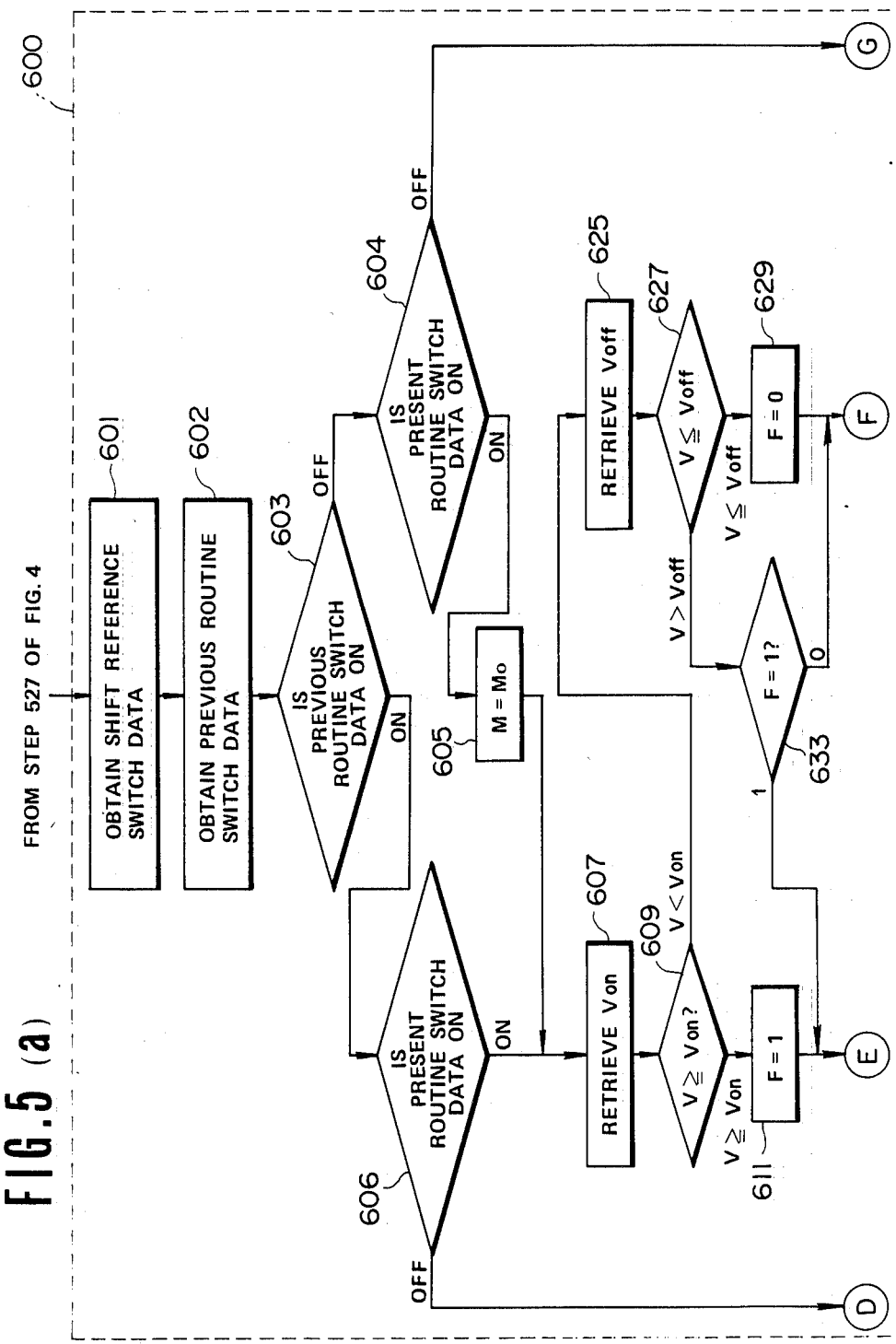
FIGS. 5(a) and 5(b), when combined, illustrate a flow chart of a complete engagement control routine 600.
Figure 5B:
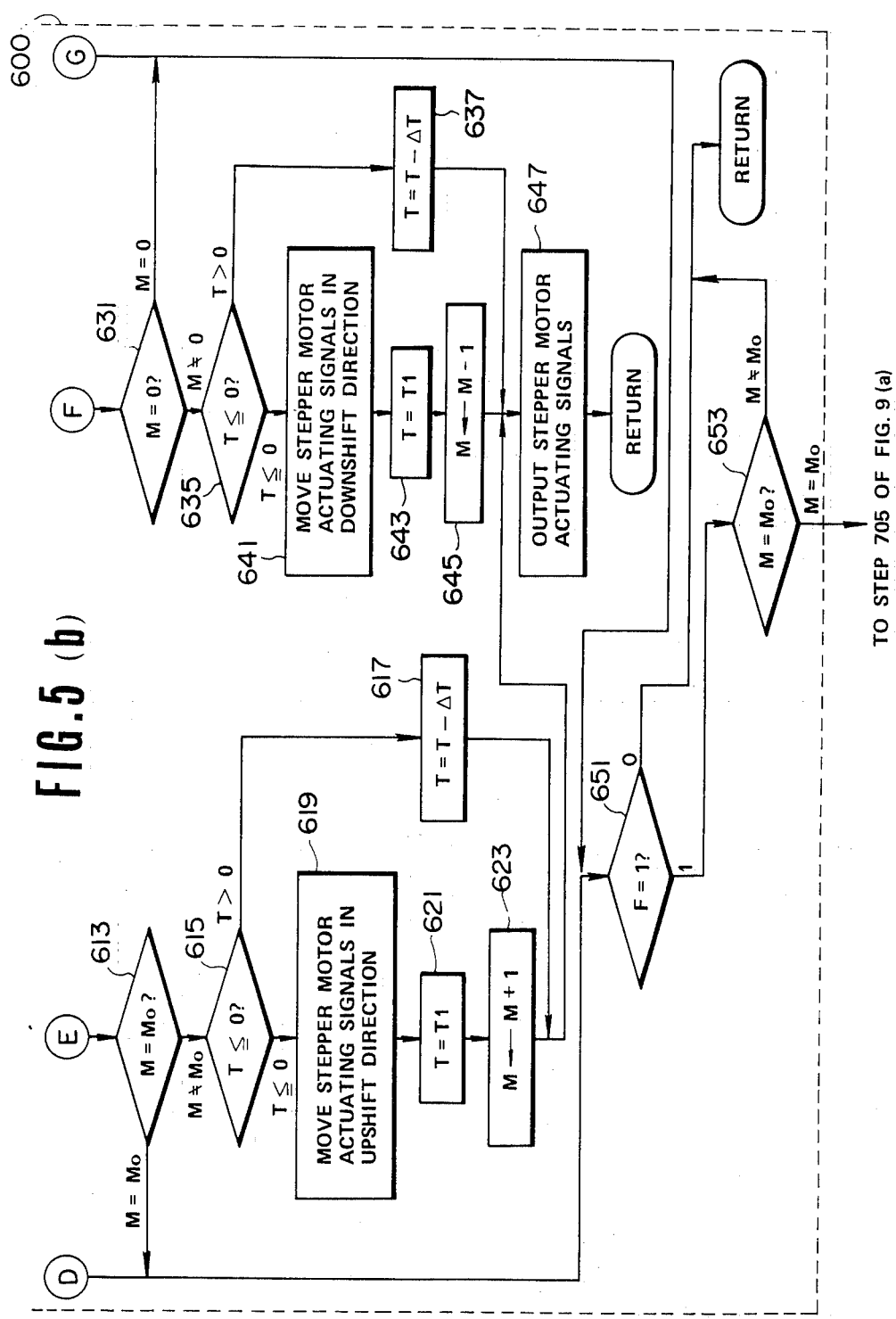

Hereinafter, the complete engagement control routine 600 is described. The complete engagement control routine 600 is shown in FIGS. 5(a) and 5(b). The complete engagement control routine 600 is executed following the step 527 of the above mentioned force motor control routine 500. That is, the program goes from the step 527 to a step 601 wherein the data of the shift reference switch 1298 in the present routine is obtained in step 601, and then the data of the shift reference switch 1298 in the preceding routine is obtained (in step 602). Then, in step 603, a determination is made whether the shift reference switch 1298 was turned on during the preceding routine or not. If the shift reference switch 1298 was turned off in the preceding routine, a determination is made whether the shift reference switch 1298 in the present routine is turned on or not (in step 604). If it is turned on, the pulse number data M for effecting the complete engagement is given a constant pulse number Mo (in step 605) and then the program goes to a step 607. If, in the step 603, the shift reference switch 1298 in the preceding routine is turned on, a determination is made whether the shift reference switch 1298 in the present routine is turned on or not (in step 606). If it is turned on, the program goes to a step 607 wherein a complete engagement on vehicle speed Von is retrieved. The pulse number Mo indicates or corresponds to a position of the stepper motor 1110 when the shift reference switch 1298 is turned on, i.e, an instance when the rod 1182 of the shift operating mechanism 1112 has moved to the left as viewed in FIG. 2B and is about to plunge into an overstroke range. In this instance, the drive pulley revolution speed oil pressure signal begins to be admitted to the starting valve 1116 from the clutch complete engagement control valve 1108.

Figure 6:
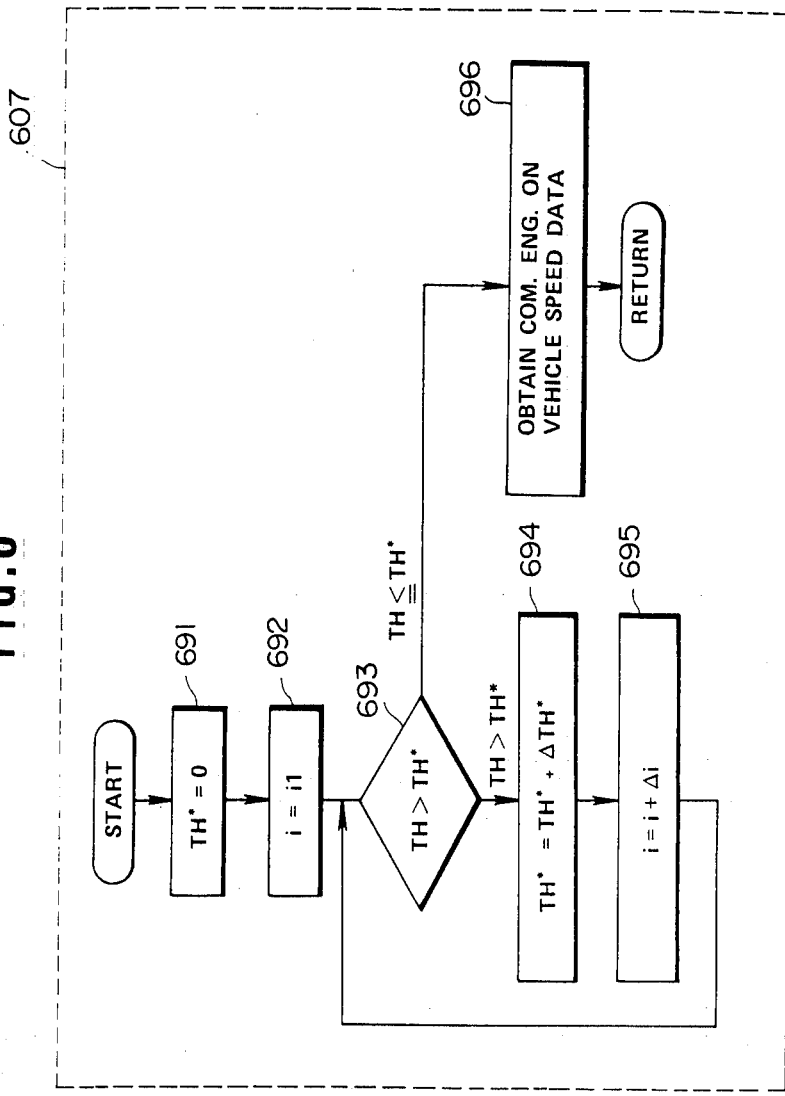
FIG. 6 is a flow chart of a data retrieval routine 607 for complete engagement on vehicle speed Von data.
Figure 7:
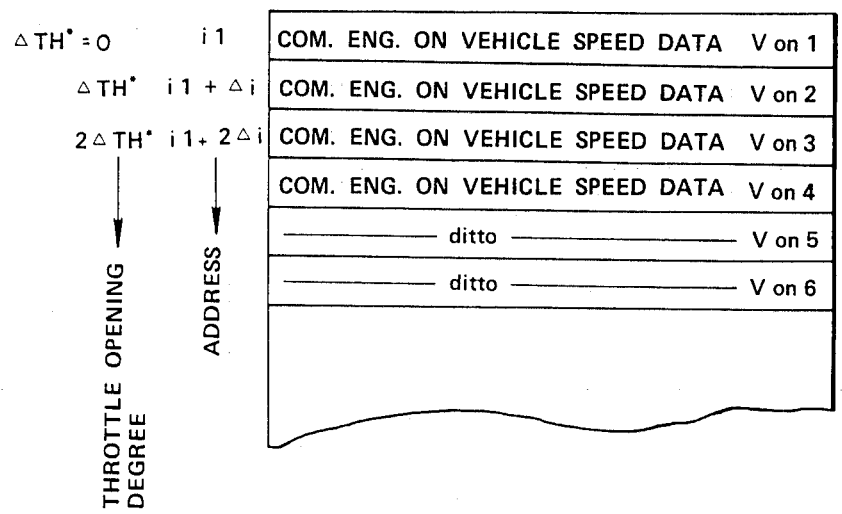
FIG. 7 is a diagrammatic view illustrating how the complete engagement on vechile speed Von data are stored in a ROM 314 shown in FIG. 3.

The complete engagement on vehicle speed retrieval routine 607 is illustrated in detail in FIG. 6. The complete engagement on vehicle speed data Von are stored in the ROM 314 against the throttle opening degrees as shown in FIG. 7. In the complete engagement on vehicle speed retrieval routine 607, a reference throttle opening degree TH* is given zero which represents an idle state (in step 691) and then an address i for the ROM 314 is given a number i1 which corresponds to the reference throttle opening degree TH* (in step 692). Then, an actual throttle opening degree TH is compared with the reference throttle opening degree TH* (in step 693). If the actual throttle opening degree is less than or equal to the reference throttle opening degree TH*, the number i1 gives an address in the ROM 314 which stores the appropriate complete engagement on vehicle speed data Von corresponding to the actual throttle opening degree. The complete engagement on vehicle speed data Von1 is obtained from the address given by the number i1 (in step 696). On the contrary, if the actual throttle opening degree TH is greater than the reference throttle opening degree TH*, the reference throttle opening degree TH* is increased by a predetermined value ΔTH* (in step 694), and the number i1 is increased by a predetermined value Δi (in step 695). Thereafter, the program returns to the step 693 again where the actual throttle opening degree TH is compared with the reference throttle opening degree TH*. By repeating the flow along the steps (steps 693, 694 and 695), the number i for the address in the ROM 314 which stores an appropriate complete engagement on vehicle speed Von corresponding to the actual throttle opening degree TH is given. If TH has become less than or equal to TH*, the complete engagement on vehicle speed date Von corresponding to the address i is obtained in step 696 before returning to the START.

The complete engagement on vehicle speed Von obtained as above is compared with the actual vehicle speed V (in step 609). If the actual vehicle speed V is greater than the complete engagement on vehicle speed Von, a complete engagement flag F is given 1 in step 611, and then a determination is made whether the complete engagement pulse number data M is equal to Mo or not in step 613. If M is not equal to Mo, the program goes to step 615. In the step 615, a determination is made whether a timer value T is less than or equal to zero or not. If the timer value T is greater than zero and thus positive, the timer value T is decreased by a predetermined value ΔT (in step 617), and the same stepper motor actuating signals as in the preceding routine are sent out (in step 647) before returning to the START. The execution of the step 617 is repeated until the timer value T becomes zero or negative. When the timer value T has become zero or negative, i.e., upon elapse of a predetermined period of time, the stepper motor actuating signals are moved by one step in an upshift direction (in step 619). Thereafter, the timer value T is given a predetermined positive value T1 (in step 621) and the pulse number M is increased by 1 (in step 623) before going to step 647 wherein the stepper motor actuating signals which have beem moved by one step in the upshift direction are set out. Thus, the stepper motor 1110 is rotated one unit in the upshift direction. By repeating the execution of the above mentioned routine, the value M is increased. When the value M has become equal to Mo, the program goes from step 613 to step 651. If, in the step 604 or 606, the shift reference switch 1298 is turned off in the present routine, the program goes directly to the step 651.

If, in step 609, V is less than Von, a vehicle speed data (a complete engagement off vehicle speed Voff) at which the complete engagement of the clutch is to be released are retrieved (in step 625). This retrieval is substantially the same as the retrieval routine 607 for the complete engagement on vehicle speed data Von (except that the stored data are different in the following respects), and thus description thereof is omitted.

Figure 8:
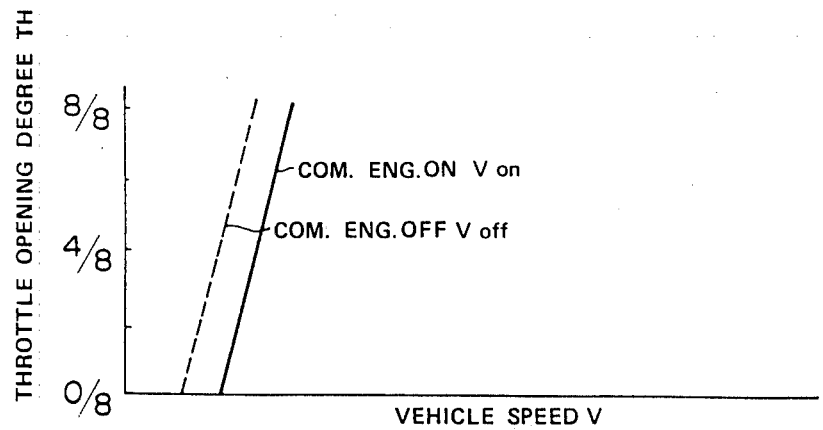
FIG. 8 is a graph showing the relationship between the complete engagement on vehicle speed Von and the complete engagement off vehicle speed Voff.

The complete engagement on vehicle speed data Von and the complete engagement off vehicle speed data Voff have the relation as shown in FIG. 8. The relation that Von is greater than Voff provides a hysterisis. This prevents the occurrence of hunting. Preferrably, as shown in FIG. 7, the vehicle speed data Von and Voff increase as the throttle opening degree TH increases.

Returning to FIGS. 5(a) and 5(b), the complete engagement off vehicle speed data Voff that has been retrieved in step 625 is compared with the actual vehicle speed V (in step 627). If the actual vehicle speed V is less than or equal to Voff, the complete engagement flag F is given zero (in step 629) and step 631 is executed. If the actual vehicle speed V is greater than Voff, a determination is made whether the complete engagement flag F is zero or not (in step 633). If F is equal to zero, the program goes to the step 631, while if the F is equal to 1, the program goes to the previously described step 613. In the step 631, a determination is made whether the complete engagement pulse number data M is zero or not. If M is not equal to zero, a determination is made whether the timer value T is less than or equal to zero (in step 635). If the timer value T is positive, the timer value T is decreased by the predetermined value ΔT (in step 637) and the same stepper motor actuating signals as those in the preceding routine are sent out (in step 647) before returning to the START. After repeating the above steps, the timer value T is decreased repeatedly by the predetermined value ΔT so that the timer valve T becomes zero or negative upon elapse of a predetermined period of time. When the timer value T has become zero or negative, the stepper motor actuating signals are moved by one step in the downshift direction (in step 641). Then, the timer value T is given the predetermined positive value T1 (in step 643), the pulse number M is decreased by 1 (in step 645), and then stepper motor actuating signals which have been moved by one step in the downshift direction are sent out (in step 647) before returning to the START. As a result, the stepper motor 1110 is rotated by one unit in the downshift direction. After repeating the above mentioned flow, the value M is gradually decreased and when the value M has become equal to zero, the program goes from the step 631 to the step 651. The value M is set as zero to indicate the position of the stepper motor 1110 when the rod 1182 of the shift operating mechanism 1112 has moved to the leftmost position as viewed in FIG. 2, i.e., the final or limit position of the overstroke range.

Figure 9:
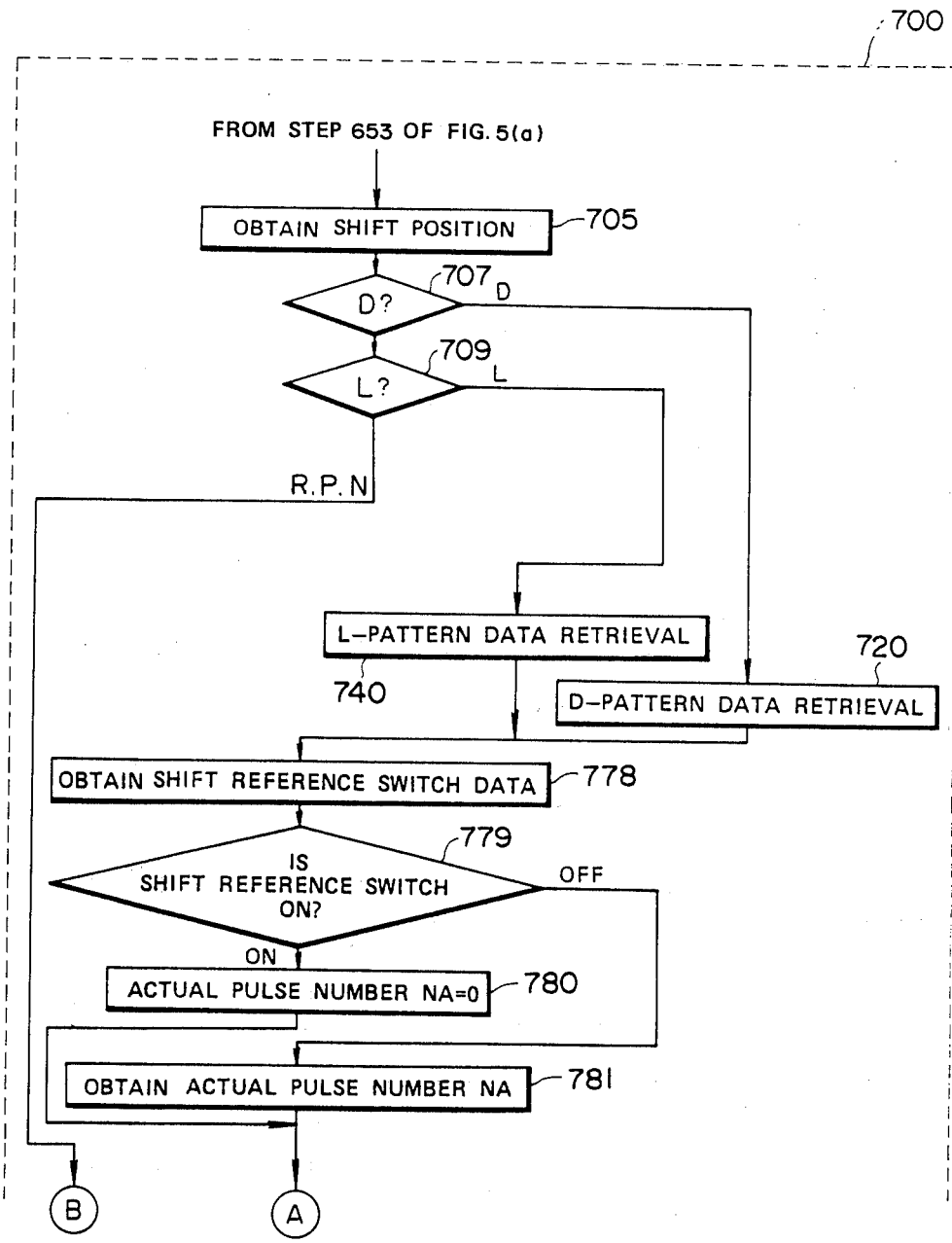
FIGS. 9(a) and 9(b), when combined, illustrate a stepper motor control routine 700.
Figure 9B:
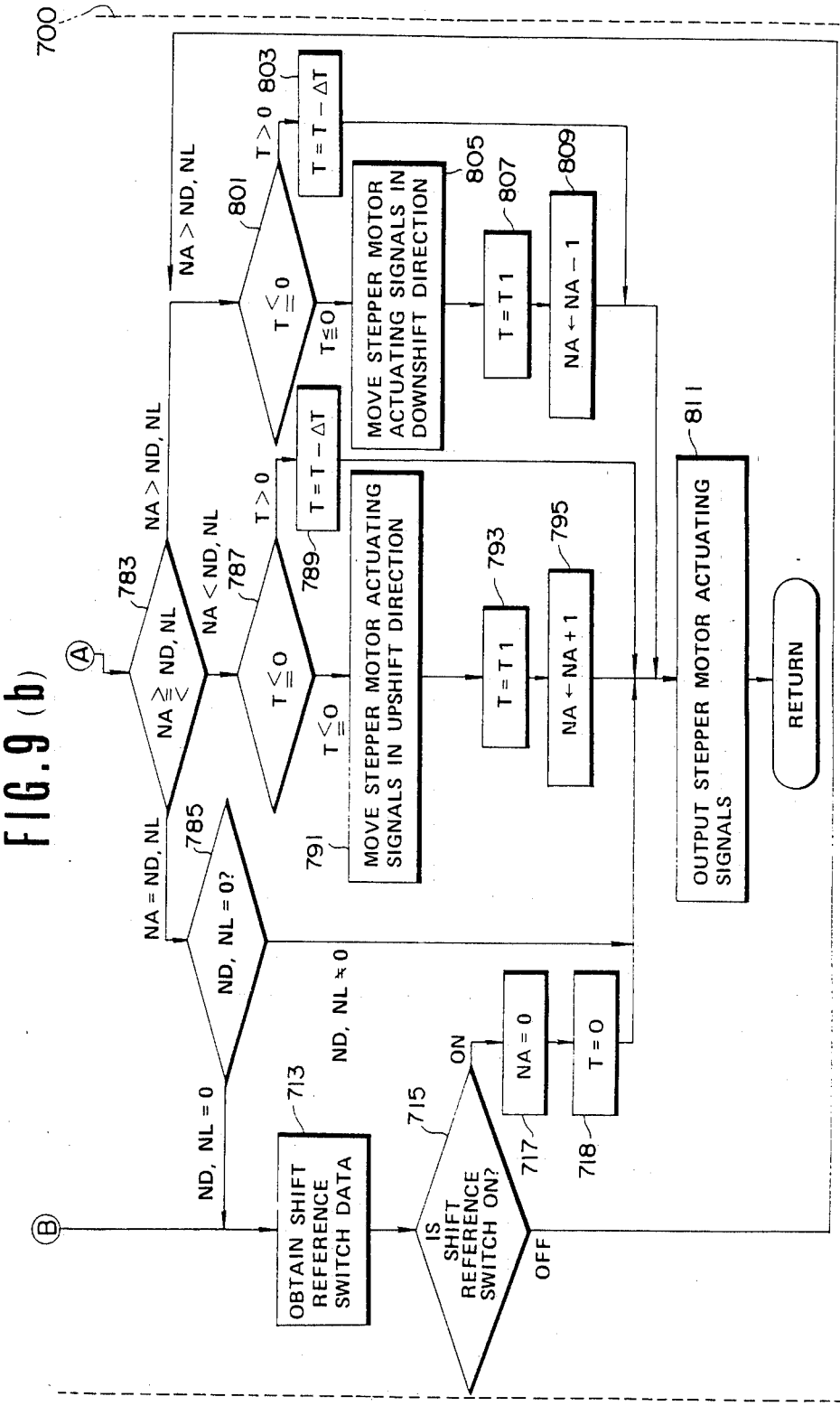
Figure 10:
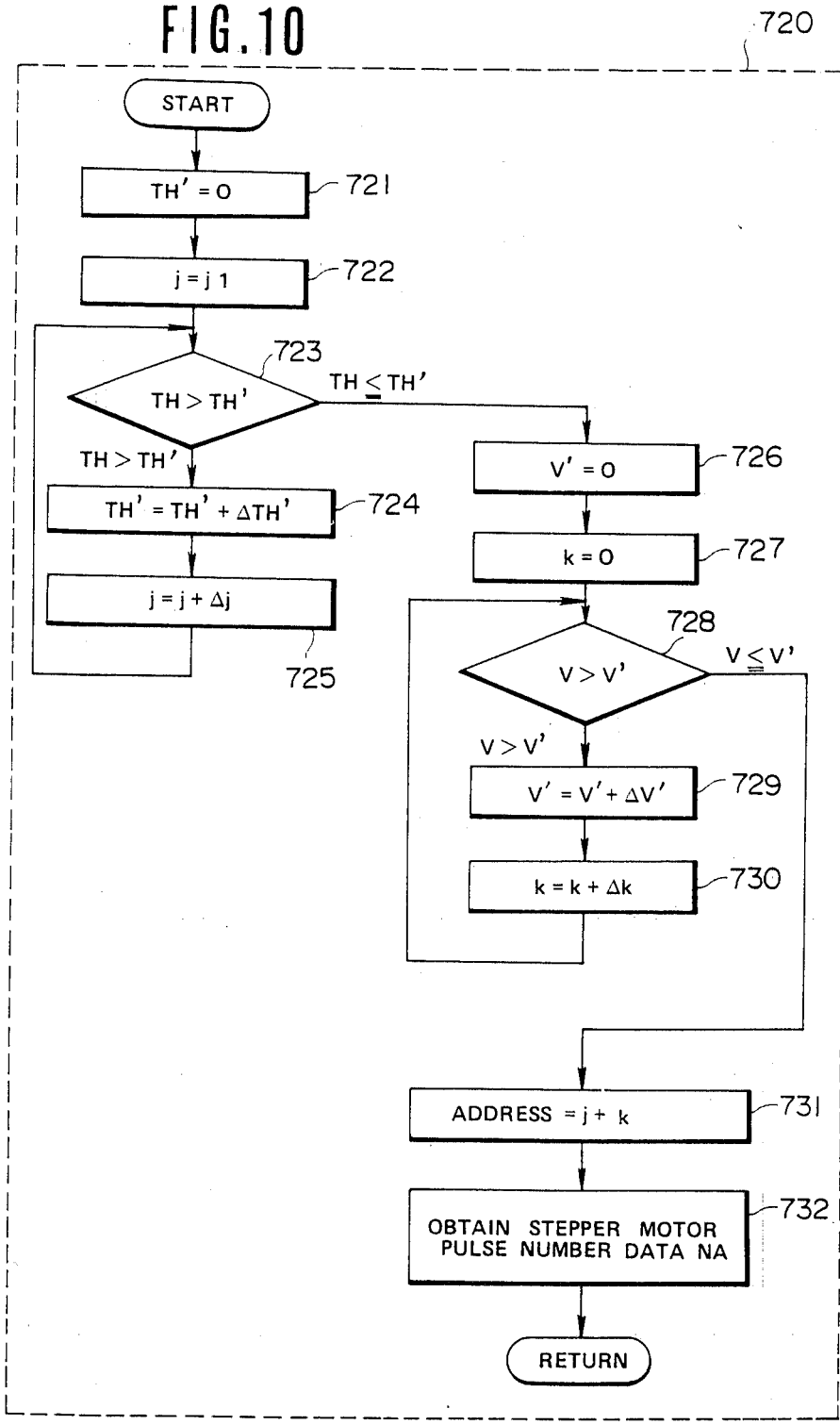
FIG. 10 is a flow chart showing a D-range shift pattern retrieval routine 720.

In step 651, a determination is made whether the complete engagement flag F is equal to 1 or not. If F is equal to 1, a determination is made whether the complete engagement pulse number M is equal to Mo or not (in step 653). If M is not equal to Mo, the program returns to the START, while if M is equal to Mo, the program goes to a step 705 of a stepper motor control routine 700 which is shown in FIGS. 9(a) and 9(b) and described after. This means that the stepper motor control routine 700 is executed only after the clutch has been completely engaged and M is equal to Mo.

Hereinafter, the complete engagement control routine 600 is described in terms of how it acts depending upon the cases it is involved.

In the case the shift reference switch 1298 was turned off in the preceding routine and is turned on in the present routine and a flow along steps 603→604→605→607→609 is executed: The pulse number M is given Mo in step 605. If V is greater than or equal to Von in step 609, the stepper motor 1110 is not rotated. That is, the complete engagement state of the clutch is maintained (a flow along steps 611→613→651). If V is less than Von in step 609, V is compared with Voff is step 627. If V is less than or equal to Voff, the stepper motor 1110 is rotated toward the overstroke range until M becomes equal to zero so as to release the complete engagement of the clutch (a flow along steps 625→627→629→631→635→(637)→641→643→645→647). If V is greater than Voff (i.e., V is greater than Voff and less than Von, i.e., V is disposed within the hysterisis range) and the complete engagement was maintained in the preceding routine, the stepper motor 1110 is rotated until M becomes equal to Mo with the complete engagement maintained (a flow along steps 627→633→613 and onwards). If the complete engagement was not maintained in the preceding routine, the stepper motor 1110 is rotated with the complete engagement released until M becomes equal to zero (a flow along steps 627→633→631 and onwards). Since, as described before, the shift reference switch 1298 is designed to be turned on right before the rod 1182 of the shift operating mechanism 1112 enters into the overstroke range, the rod 1182 is moved to the point whereat the largest reduction ratio is established during kickdown where the accelerator pedal is depressed rapidly while the vehicle is travelling, thus turning on the shift reference switch 1298. Although in this state the shift reference switch 1298 is turned on, since V is apparently greater than Von, the complete engagement state is maintained.

In the case the shift reference switch 1298 was turned off in the preceding routine and is turned off in the present routine, either (a flow along steps 603→604), the program goes to step 651.

In the case the shift reference switch 1298 was turned on in the preceding routine and is turned on in the present routine, too (a flow along steps 603→606→607): If V is greater than or equal to Von, the stepper motor 1110 is rotated until M increases up to Mo (a flow along steps 609→611→613→615→(617)→619→621→623→647) so as to completely engage the clutch, and the program goes to step 651. If V is less than Voff, V is compared with Voff. If V is less than or equal to Voff, the stepper motor 1110 is rotated until M becomes equal to zero so as to release the complete engagement (a flow along steps 627→629→631→635→(637)→641→643→645→647). If V is greater than Voff in step 627 (i.e., V is greater than Voff and less than Von), the stepper motor 1110 is rotated until M becomes equal to Mo if the complete engagement was maintained in the preceding routine (a flow along steps 627→633→613 and onwards). If the complete engagement was released in the preceding routine the stepper motor 1110 is rotated until M becomes equal to zero (a flow along steps 627→633→631 and onwards). That is, the state in the preceding routine, i.e., the complete engagement maintained or released, is maintained.

In the case the shift reference switch 1298 was turned on in the preceding routine and is turned off in the present routine (a flow along steps 603→606), the program goes to step 651.

The condition under which the program goes from the step 651 to the stepper motor control routine 700 is when M becomes equal to Mo as described before.

Hereinafter, the control routine for the stepper motor 1110 is described. The stepper motor control routine 700 is illustrated in FIGS. 9(a) and 9(b). This stepper motor control routine 700 is executed only when M is equal to Mo in step 653 of the complete engagement control routine 600 (i.e., when the clutch is completely engaged). First, a shift position is obtained from a shift position switch 304 (in step 705). Second, a determination is made whether a shift position is in "D" position or not (in step 707). If the shift position is in "D" position, D range shift pattern retrieval routine is executed (in step 720).

The D range shift pattern data retrieval routine in step 720 provides a desired optimum reduction ratio indicative signal. The desired reduction ratio indicative signal represents a desired optimum reduction ratio for the detected operating condition of the automotive vehicle and is expressed in terms of a number of pulses ND which is hereinafter called as a stepper motor pulse number. The D range shift pattern data retrieval routine is executed in a manner illustrated in FIG. 10. The stepper motor pulse number data ND are stored in the ROM 314 in a matrix shown in FIG. 11. The vehicle speed values are arranged along the lateral axis and the throttle opening degree values are arranged along the vertical axis (the vehicle speed increases toward the right in FIG. 11 and the throttle opening degree increases toward the bottom in FIG. 11). Referring to the D range shift pattern data retrieval routine 720 shown in FIG. 10, a reference throttle opening degree TH' is given zero which corresponds to idle state in step 721 and an address j of the ROM 314 where a stepper motor pulse number data which corresponds to zero throttle opening degree is given a number j1 in step 722. Subsequently, the actual throttle opening degree TH is compared with the reference throttle opening degree TH' in step 723. If the actual throttle opening degree TH is greater than TH', the reference throttle opening degree TH' is increased by a predetermined value ΔTH' in step 724 and the address j is increased by a predetermined value Δj in step 725. After this step, the actual throttle opening degree TH is compared with the reference throttle opening degree TH' again (in step 723), and if the actual throttle opening degree TH stays greater than TH', a flow along the steps 724, 725 and 723 is repeated. After the execution of the flow along the steps 723, 724 and 725 has been repeated, the number j corresponding to the actual throttle opening degree TH is given when the actual throttle opening degree TH becomes equal to or less than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set of the actual throttle opening degree TH and the actual vehicle speed V, and the stepper motor pulse number data ND is obtained from this address in step 732. The pulse number data ND thus obtained shows a desired stepper motor pulse number to be given for the actual throttle opening degree TH and the actual vehicle speed V. The D range shift pattern data retrieval routine 720 ends with the step of retrieving the pulse number data ND before the program returns to START.

Referring to FIG. 9(a), if the "D" range position is not selected as the result of the determination in the step 707, then a determination is made in step 709 whether the "L" range position is selected. If the "L" range position is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

After the data retrieval of the suitable pulse number data ND or NL in the corresponding step 720 or 740, a shift reference switch data is obtained from the shift reference switch 1298 in step 778 and then a determination is made whether the shift reference switch 1298 is in the on-state or the off-state in step 779. The shift reference switch data indicates whether the shift reference switch 1298 is turned on or off. If the shift reference switch 1298 is in the off state, the actual stepper motor pulse number data NA is retrieved from the RAM 315 in step 781. This pulse number data NA corresponds one to one to the actual rotary position of the stepper motor 1110 unless there is any electric noise. If, in the step 779, the shift reference switch 1298 is in on state, the pulse number data NA is given zero in step 780. The shift reference switch 1298 is so designed as to be turned on when the rod 1182 assumes a position corresponding to the largest reduction ratio. This results in that the rotary position of the stepper motor 1110 always corresponds to the largest reduction ratio position whenever the shift reference switch 1298 is turned on. Because the actual pulse number data NA is given zero whenever the shift reference switch 1298 is turned on, the pulse number data NA can correspond accurately to the actual rotary position of the stepper motor 1110 should there occur a signal distortion due to electric noise. Consequently, the signal distortion due to the accumulation of noise is eliminated. Subsequently, in step 783 (see FIG. 9(b)), the actual pulse number data NA is compared with the retrieved desired pulse number data ND or NL.

Referring to FIG. 9(b), if the actual pulse number data NA is equal to the desired pulse number data ND or NL as the result of step 783, a determination is made in step 785 whether the desired pulse number ND or NL is zero. In the case the desired pulse number ND or NL is not zero when the reduction ratio is not the largest, the same stepper motor actuating signals (described hereinafter) as provided for in the preceding routine are sent out in step 811 before the program returns to START. If the desired pulse number ND or NL is zero in the step 785, the shift reference switch data is obtained from the shift reference switch 1298 in step 713, and a determination is made whether the shift reference switch 1298 is in the on state or the off state in step 715. If the shift reference switch 1298 is in the on state, the actual pulse number data NA is given zero in step 717, a stepper motor timer value T which will be described later is given zero in step 718, and then the same stepper motor actuating signals as those of the preceding routine which correspond to the zero pulse number are sent out in step 811. If, in step 715, the shift reference switch 1298 is in the off state, the execution of the steps following the step 801, which will be described later, begins.

If, in the step 783, the actual pulse number NA is less than the desired pulse number ND or NL, the stepper motor 1110 needs to be actuated toward where the pulse number increases. First, a determination is made whether the timer value T is negative inclusive zero in step 787. If the timer value T is positive, then the timer value T is decreased by a predetermined value ΔT in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 1110 are moved in the upshift direction by one stage in step 791 as described later. Then, the timer value T is given a predetermined positive value T1 in step 793. The stepper motor pulse number NA is increased by 1 in step 795, and the stepper motor actuating signals which have been moved by one stage in the upshift direction are sent out in step 811 before the program returns to START. This causes the stepper motor 1110 to rotate toward the upshift direction by one unit.

If, in step 783, the present stepper motor pulse number NA is greater than the desired pulse number ND or NL, a determination is made in step 801 whether the timer value T is zero or negative. If the timer value T is positive, the timer value T is decreased by the predetermined value ΔT (in step 803), and the same stepper motor actuating signals as those of the preceding routine are sent out in step 811 before the program returns to START. After repeating this sequence of operations, the timer value T becomes zero or negative after the elapse of a predetermined period of time because the decrement of the timer value T by the predetermined value ΔT is repeated. When the timer value T becomes zero or negative, the stepper motor actuating signals are moved toward a downshift direction by one stage in step 805. Then the timer value T is given the predetermined positive value T1 in step 807. The stepper motor pulse number data NA is decreased by 1 in step 809, and the stepper motor actuating signals having been moved in the downshift direction are sent out (in step 811) before the program returns to START. This causes the stepper motor 110 to rotate in the downshift direction by one unit.

Figures 11, 12:
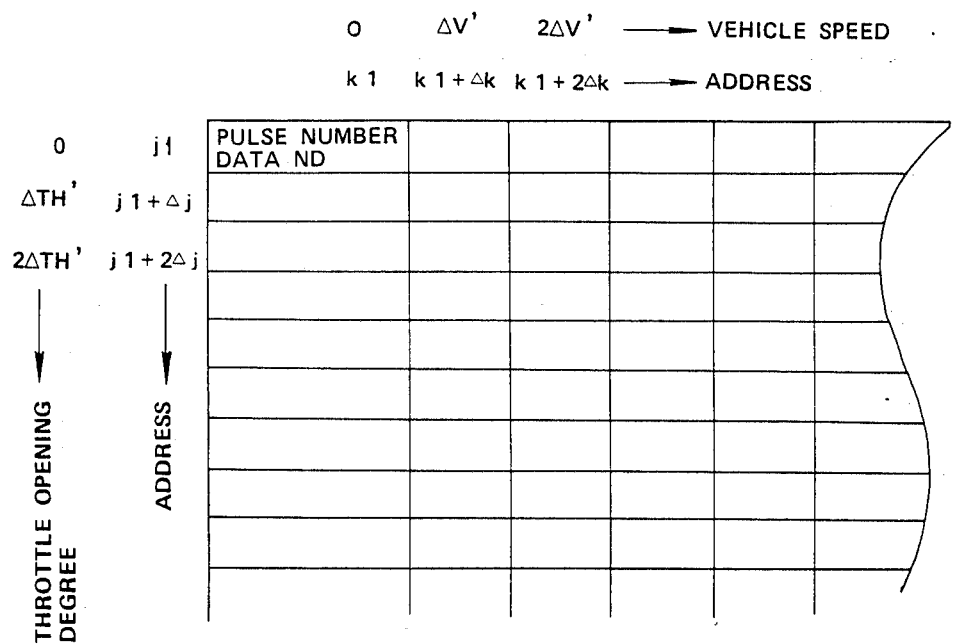
FIG. 11 is a diagrammatic view illustrating how pulse number data ND are stored in a matrix in the ROM 314 versus throttle opening degree TH and vehicle speed V.
FIG. 12 is a chart illustrating various modes of stepper motor actuating signals applied to output leads 317a, 317c, 317b and 317d of the stepper motor 110.
Figure 13:
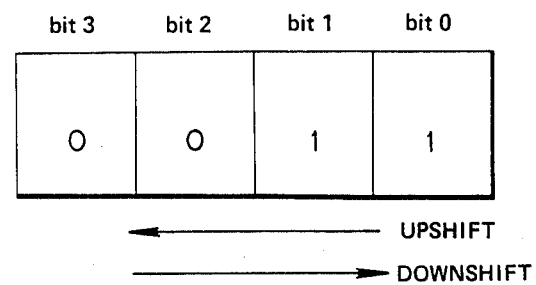
FIG. 13 is a diagrammatic view of the content of four bit positions corresponding to the mode A.
Figure 14:
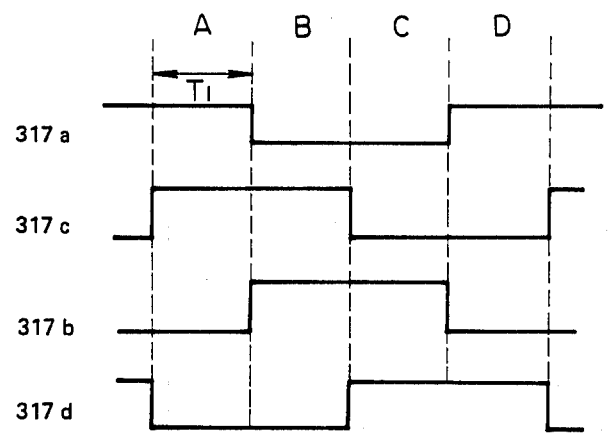
FIG. 14 is a timing diagram of the stepper motor actuating signals.

Referring to FIGS. 12 to 14 and particularly to FIGS. 13 and 14, the stepper motor actuating signals will now be described. The stepper motor 1110 is connected with four output lead lines 317a, 317b, 317c, and 317d (see FIG. 3) having thereon respective signals which may vary in four modes A~D, and the stepper motor 1110 rotates in the upshift direction (the direction denoted by an arrow X as shown in FIG. 3 if the actuating signals are moved in the sequence of A→B→C→D→A, and the stepper motor 1110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 1110 is to be rotated in the upshift direction, the bits are rotated to the right, i.e., the digits are moved one place to the left. When the stepper motor 1110 is to be rotated one step in the downshift direction, the bits are rotated to the left, i.e., the digits are moved one place to the right.

The variation of the signals on the output lead lines 317a, 317c, 317b, and 317d upon upshifting is illustrated in FIG. 14. In FIG. 14, the period of time during which each of modes A, B, C and D stays constant, agrees with the timer value T1 which has been obtained in the step 793 or 807.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 1110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 1110 in the downshift direction. When the actual reduction ratio agrees with the desired optimum reduction ratio, the actuating signals are not moved to the left nor right, and the same actuating signals as those of the preceding routine are sent out. In this case, the stepper motor 1110 will not rotate, thus maintaining the reduction ratio constant.

If, in the previously described step 709 shown in FIG. 9(a), the "L" range position is not selected, i.e., if "R" or "P" or "N" range is selected, the execution of the step 713 and its following steps begins. The shift reference switch data is obtained from the shift reference switch 1298 in step 713 and if the shift reference switch 1298 is in the on state, the actual pulse number NA is given zero in step 717 and the stepper motor timer value T is given zero in step 718. Then, the same actuating signals as those of the preceding routine are sent out in step 811 before the program returns to START. If the shift reference switch 1298 is in the off state, the steps following the step 801 are executed which have been described. That is, the stepper motor 110 is rotated in the downshift direction. Accordingly, the largest reduction ratio is maintained when the shift position is in "R" or "P" or "N".

Hereinafter, a description is made as to how the desired optimum reduction ratio is determined.

Referring to FIGS. 15–19, a description will now be given as to how the desired optimum reduction ratio is determined to satisfy the minimum fuel consumption rate curve during operation in the D range.

Figure 15:
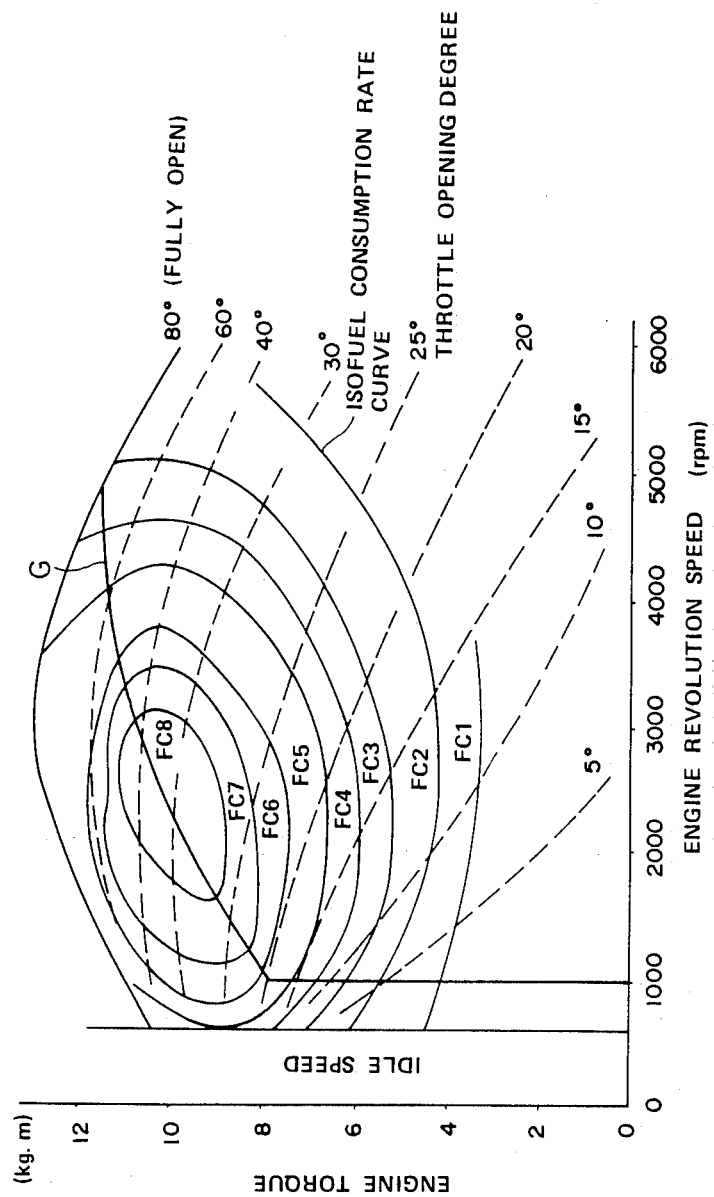
FIG. 15 is a graph showing a minimum fuel consumption rate curve G.
Figure 16:
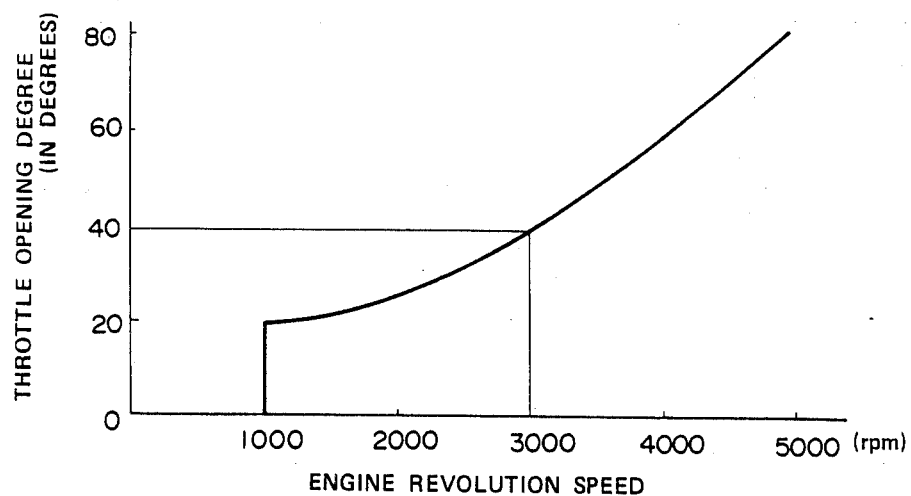
FIG. 16 is a graph showing the minimum fuel consumption rate curve expressed in terms of the throttle opening degree and engine revolution speed.
Figure 17:
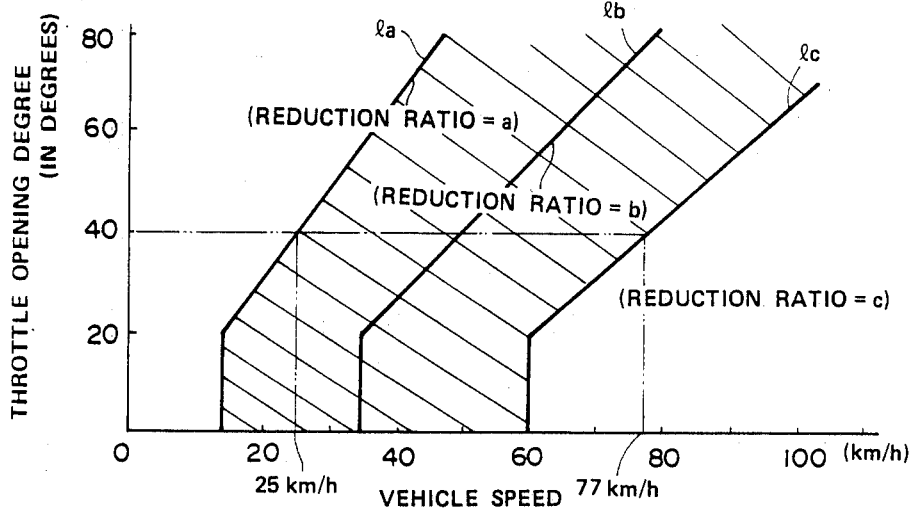
FIG. 17 is a graph showing the relationship shown in FIG. 16 expressed in terms of the throttle opening degree and vehicle speed for various reduction ratios.

Referring to FIG. 15, the engine performance curve is shown. In FIG. 15, engine revolution speed is expressed on the axis of abscissas and engine torque on the axis of ordinates and there are shown engine torque vs., engine revolution speed characteristic curves, each for a throttle opening degree (each curve being accompanied by a throttle opening degree) and there are also shown isofuel consumption rate curves FC1∼FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 1110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the clutch 1004 or 1024 is completely engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the engine revolution speed N which satisfies a predetermined relation with the throttle opening degrees, i.e., engine load, as shown in FIG. 16. If the relation shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), and line lb denotes the variation upon selecting an intermediate reduction ratio b. For example, the vehicle can run at vehicle speeds from 25 km/h to 77 km/h with the throttle opening degree being 40 degrees while the reduction ratio decreases. The reduction ratio remains at a below 25 km/h and at c above 77 km/h with the throttle opening degree being 40 degrees. A predetermined relation exists between the position of the rod 1182 of the shift operating mechanism 1112 and the reduction ratio. This means that a predetermined relation exists between the stepper motor pulse number applied to the stepper motor 1110 (i.e., rotary position of the stepper motor 1110) and the reduction ratio as shown in FIG. 18.

Figure 18:
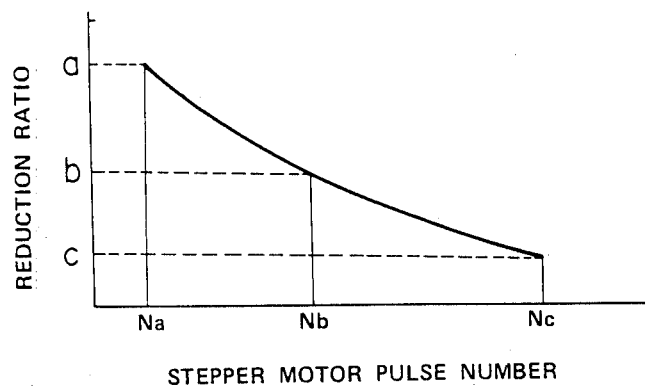
FIG. 18 is a graph showing a predetermined relationship of the reduction ratio with the stepper motor pulse number.
Figure 19:
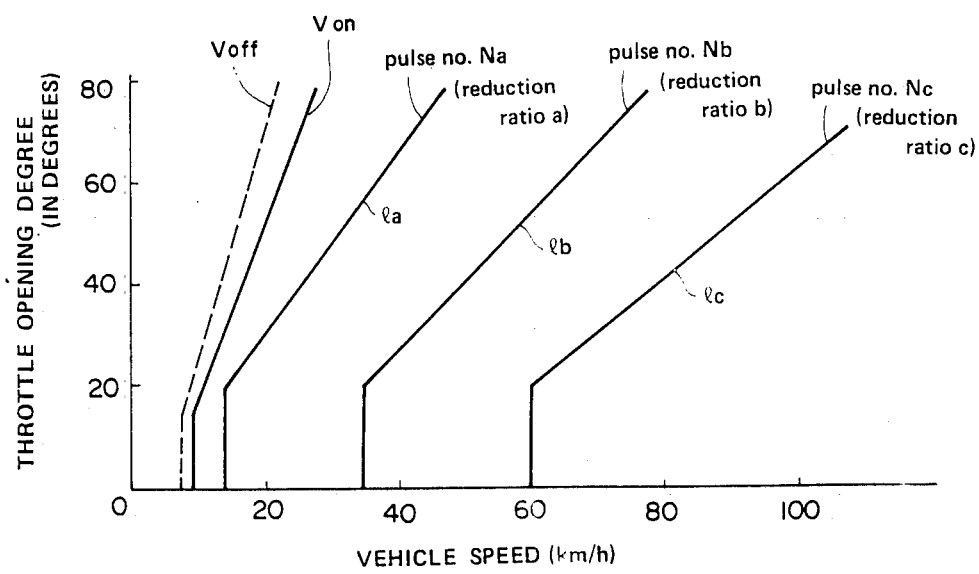
FIG. 19 is a graph showing a predetermined relationship shown in FIG. 16 expressed in terms of the throttle opening degree and vehicle speed for various pulse numbers.

Thus, the reduction ratios (a or b or c) shown in FIG. 17 can be converted into respective pulse numbers using the graph shown in FIG. 18. The result of this conversion is illustrated in FIG. 19. Also shown in FIG. 19 are complete engagement on Von and off Voff vehicle speed lines shown in FIG. 8 from which it will be understood that the complete engagement on and off vehicle speeds Von and Voff are disposed on the lower vehicle speed side of the line la with the largest reduction ratio a.

Control of the continuously variable transmission along the shift pattern illustrated in FIG. 19 is as follows. Before starting the vehicle, the continuously variable transmission is maintained at the largest reduction ratio by the maximum reduction ratio maintaining valve 1120. As the engine revolution speed increases, the forward clutch 1004 is gradually engaged and, when the vehicle speed exceeds the complete engagement on vehicle speed Von line, the forward clutch 1004 is completely engaged. When the vehicle speed increases further and exceeds the line la, the reduction ratio continuously varies between the reduction ratio a and the reduction ratio c in such a manner as to satisfy the relation denoted by the minimum fuel consumption rate curve G shown in FIG. 15. For example, if the throttle opening degree is increased from a state where the vehicle is running at a constant vehicle speed with a constant throttle opening degree in an operating range falling between lines la and lc, the desired engine revolution speed changes and the desired pulse number changes with the change in the desired revolution speed as determined by the relation illustrated in FIG. 16. The stepper motor 1110 rotates to a new rotary position in response to the new desired stepper motor pulse number, establishing a new reduction ratio, thus allowing the actual engine revolution speed to agree with the new desired engine revolution speed. The engine is controlled to operate along the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

From the description above, it will be understood that the desired optimum reduction ratio is determined by the vehicle speed and the desired engine revolution speed which satisfies the predetermined relation with the engine load.

Figure 20:
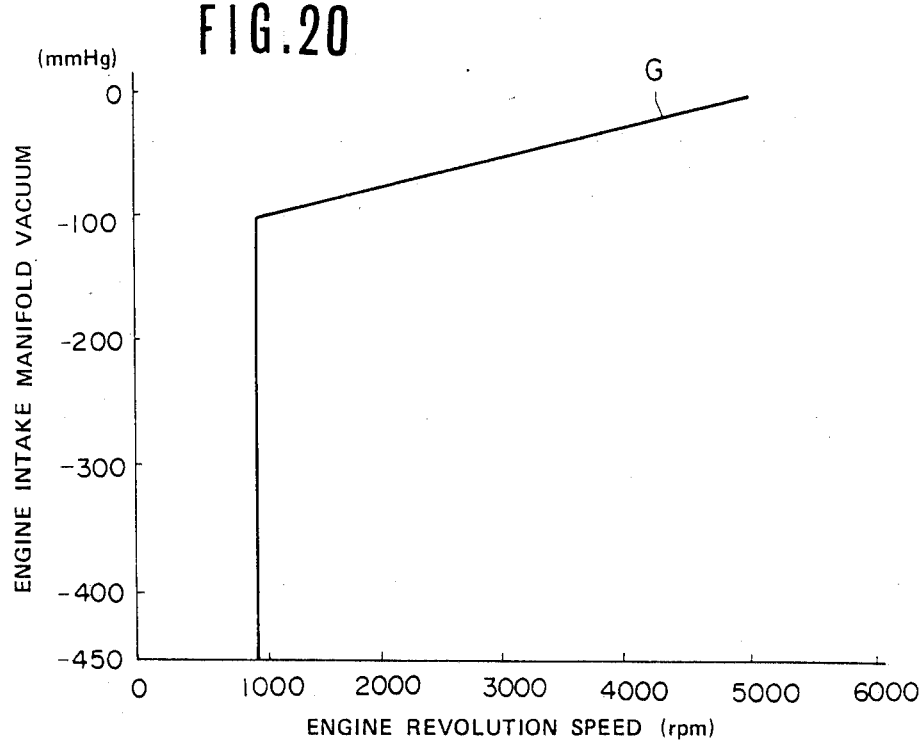
FIG. 20 is a graph showing the minimum fuel consumption rate curve expressed in terms of intake manifold vacuum and engine revolution speed.
Figure 21:
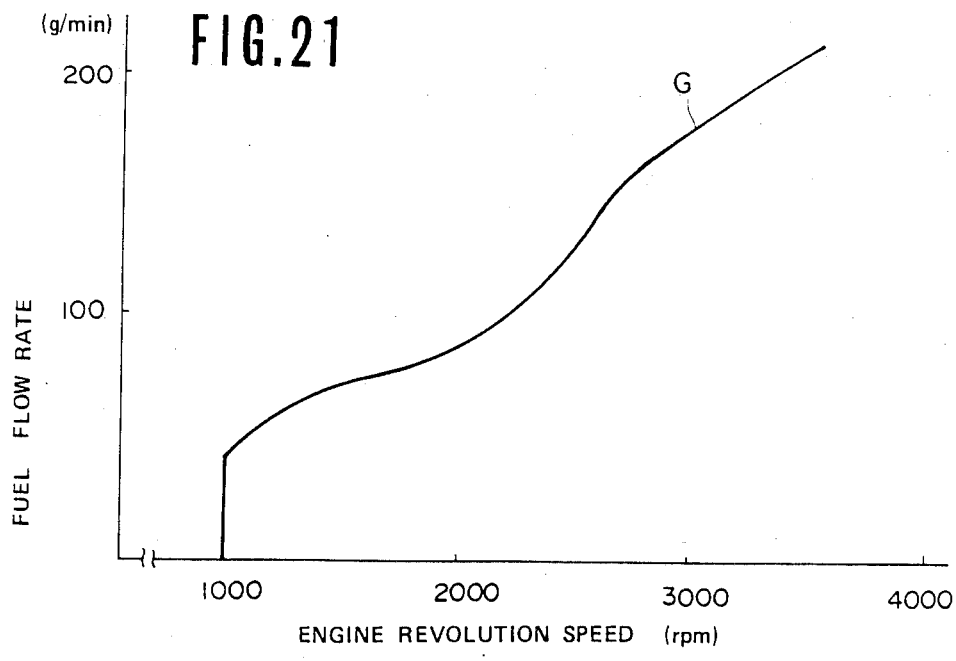
FIG. 21 is a graph showing the minimum fuel consumption rate curve expressed in terms of fuel flow rate.

In the embodiment described above, the control is based on the engine throttle opening degree, but it is also possible to carry out a similar control based on the intake manifold vacuum or the fuel flow rate. FIGS. 20 and 21 illustrate the minimum fuel consumption rate curves G for the latter two cases, respectively.

The above description has focused mainly on the shift pattern to be followed upon selecting the "D" range position, but all that is necessary for operation in the "L" range position is to give data relating to different shift patterns from those for "D" range. For example, for the same throttle opening degree, a shift pattern for the "L" range is designed to give a larger reduction ratio as compared to the reduction ratio which is given by the shift pattern for the "D" range for the purpose of enhancing acceleration performance and ensuring adequate engine braking performance at zero throttle opening degree. In a shift pattern for the "L" range, a reduction ratio larger than the reduction ratio given by the shift pattern for the "D" range is given for the same throttle opening degree. These shift patterns can be accomplished simply by inputting appropriate predetermined pulse data. A more detailed explanation of the operation in the "L" range is omitted since the basic actions carried out to effect the control are the same as in the "D" range.

Next, a brief explanation will be given as to the engine coolant temperature sensor 306 and the brake sensor 307.

The engine coolant temperature sensor 306 is switched "on" when the engine coolant temperature is below a predetermined value (for example, 60° C.). When the engine coolant temperature sensor 306 is in the "on" state, the shift pattern for the "D" range is switched in response to this signal to a shift pattern having larger reduction ratios. This eliminates irregular running of the engine and engine power shortage which otherwise would take place upon start-up of a cold engine.

The brake sensor 307 is switched "on" when the foot brake is actuated. If the brake sensor 307 is in the "on" state and at the same time the throttle opening degree is zero, the shift pattern for the "D" range is switched to a shift pattern giving larger reduction ratios. This ensures strong engine braking upon depressing the foot brake when operating in the "D" range.

In the following description, the control system for the hydraulic automatic clutch which has been described is summarized. The control system comprises the hydraulic clutch which may be in the form of the forward clutch 1004 or the reverse clutch 1024, means in the form of the pitot tube 1020 for generating the oil pressure signal, in the oil conduit 1214, indicative of the engine revolution speed, the start adjustment valve 1118, the starting valve 1116, and the electronic control unit 1300. The hydraulic clutch 1004 or 1024 is hydraulically actuated in response to the start pressure Ps supplied thereto by the starting valve 1116. With the control unit 1300, the current I passing through the force motor 1224 of the start adjustment valve 1118 is so controlled as to maintain the start pressure Ps in the proximity of the desired value as will be readily appreciated from FIG. 4 when the engine idles with the vehicle at a standstill. Explaining in more detail, if the idle revolution speed is elevated as a result of the use of a choke under cold weather, the engine revolution speed indicative oil pressure signal acted on the differential area between the lands 1206c and 1206d of the starting valve 1116 is elevated accordingly, resulting in an increase in the start pressure Ps. If the start pressure Ps which has been elevated exceeds the upper limit value Psu, the current I passing through the force motor 1224 of the start adjustment valve 1118 is so varied as to increase the start adjustment oil pressure which acts on the land 1026c as opposed to the engine revolution speed indicative oil pressure. When the start pressure Ps drops as a result of a drop in engine revolution speed, the start adjustment pressure is decreased to increase the start pressure Ps. As a result, the start pressure Ps when the engine idles with the vehicle at a standstill is always kept at the desired value. It will now be understood that, when the engine idles with the vehicle at a standstill, the hydraulic clutch 1004 or 1024 is maintained in the predetermined desired state even if the idle speed of the engine varies, thus preventing a racing of the engine nor an unintentional starting of the vehicle.

Figure 22:
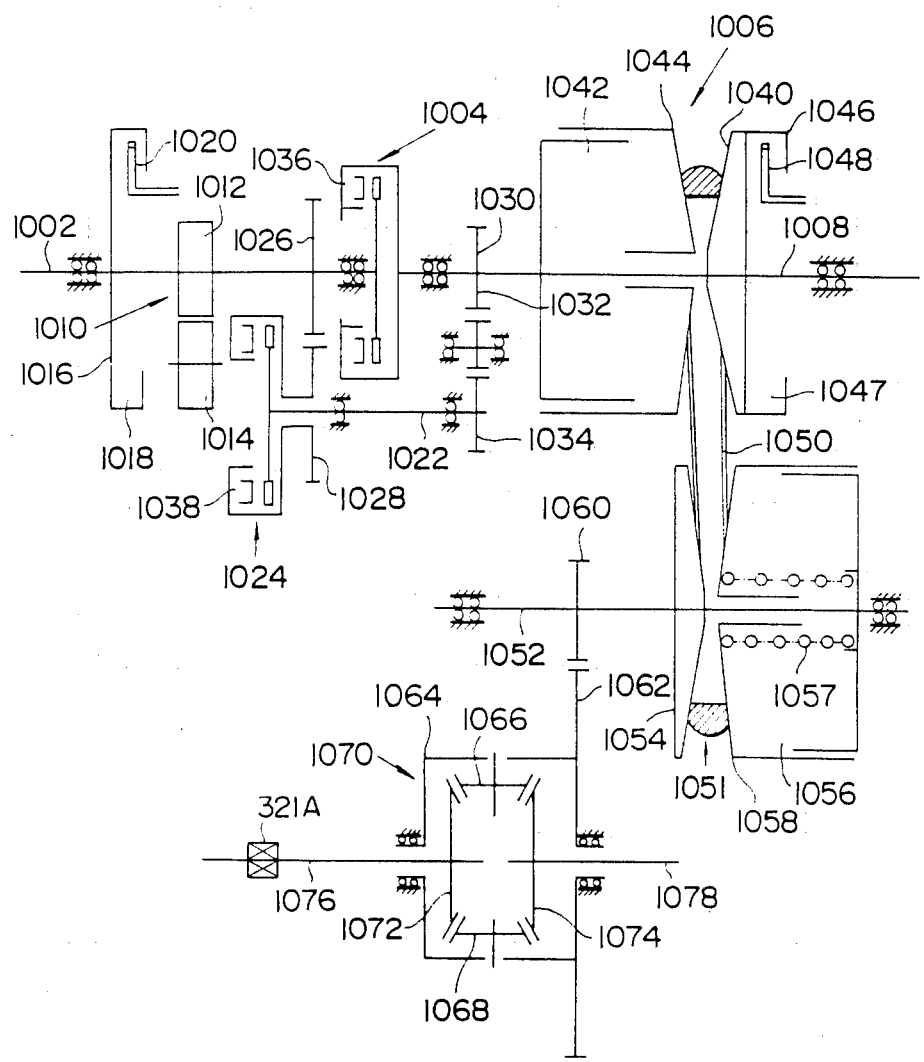
FIG. 22 is a similar view to FIG. 1 illustrating a continuously variable transmission including a second embodiment according to the present invention.
Figure 23:
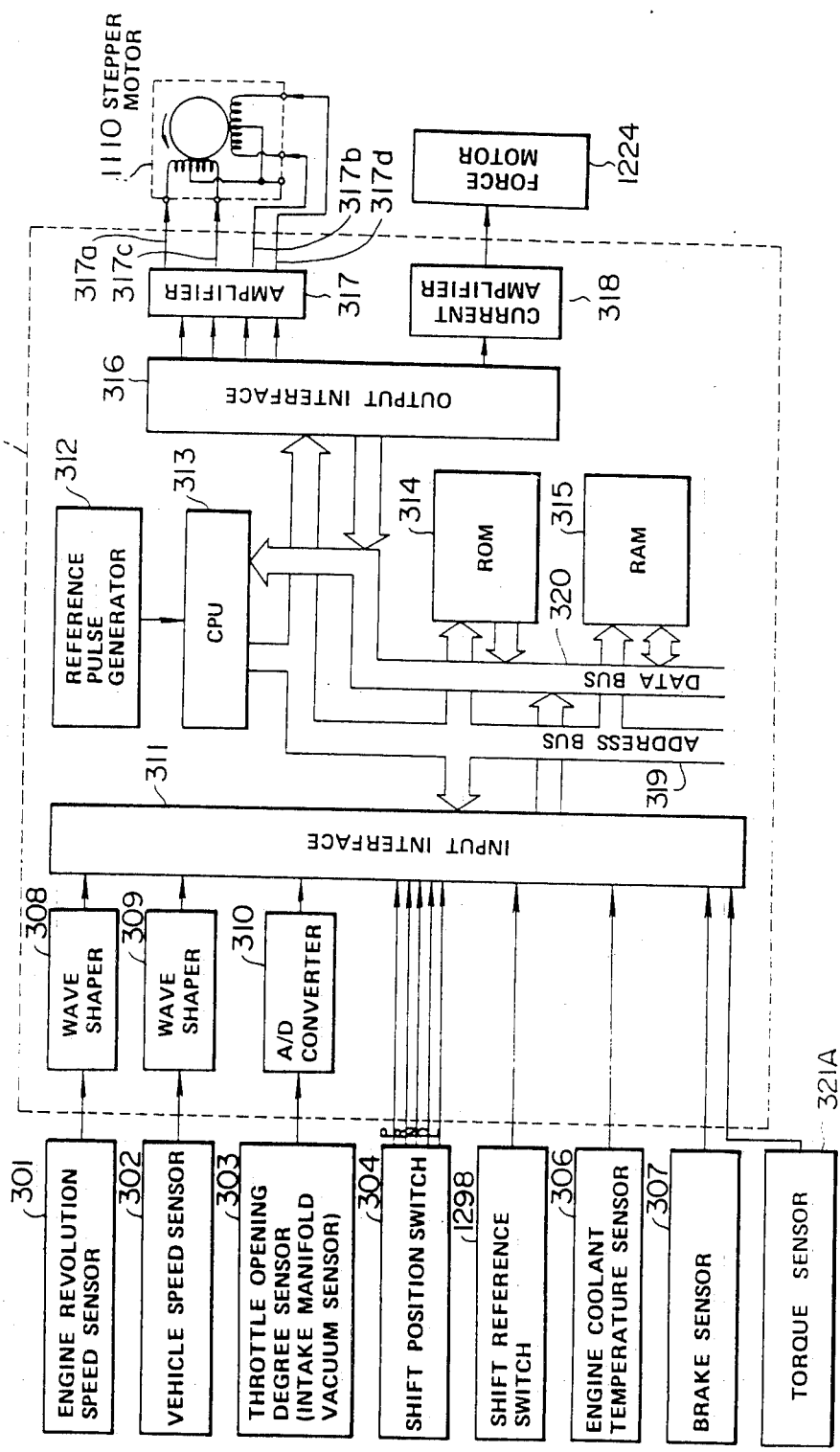
FIG. 23 is a similar view to FIG. 3 showing an electronic control unit used in the second embodiment.

Referring mainly to FIGS. 22 to 24, a second embodiment according to the present invention is described.

The second embodiment is substantially similar to the first embodiment, but different in that instead of the pressure sensor 321 (see FIG. 3) and the force motor control routine 500 based on the output Ps of the pressure sensor 321 (see FIG. 4), a torque sensor 321A is mounted to detect a torque transmitted to an output shaft 76, i.e., a vehicle traction torque, in terms of an electric signal and a force motor control routine 500A as shown in FIG. 24 is used.

Referring to FIG. 24, the force motor control routine 500A is shown. Explaining along the steps, a throttle opening degree TH is obtained from a throttle opening degree sensor 303 (in step 501), and a vehicle speed V is obtained from a vehicle speed sensor 302 (in step 503). Thereafter, a shift position is obtained from a shift position switch 304 (in step 2100). A determination is made whether "N" position is selected (in step 2102) and a determination is made whether "P" position is selected (in step 2104). If "N" or "P" is selected, the program goes to a step 2106 wherein the force motor current signal I is given a predetermined relatively large value I1. This value I1 is so set as to correspond to a relatively large current which causes the clutch to stay in a state right before the clutch engagement. After step 2106, a step 527 is executed wherein the force motor electric current I is sent out. In this case, the start pressure Ps is relatively low. If neither "N" nor "P" is selected, the program goes to step 505 wherein a determination is made whether the vehicle speed V is less than or equal to a predetermined small value Vo or not. If it is less than the predetermined value Vo, a determination is made in step 507 whether the throttle opening degree TH is less than or equal to a predetermined small value THo or not. If it is less than the predetermined value THo (i.e., in the case when the engine idles with the vehicle at a standstill), the program goes to a step 2509 wherein a torque Tr is obtained from the torque sensor 321A. If the vehicle speed V is greater than the predetermined value Vo in step 505 or the throttle opening degree TH is greater than the predetermined value THo in step 507, the program goes to step 527 wherein the same electric current signal I as that in the previous routine is sent out, i.e., the electric signal given at the instance immediately before the vehicle speed V has become greater than the predetermined value Vo or the throttle opening degree TH has become greater than the predetermined value THo. After obtaining the torque Tr in step 509, the program goes to a step 2511 where a determination is made whether the torque Tr is greater than a desired torque upper limit value Tru. If Tr is greater than Tru, the force motor electric current signal I is increased by a small value ΔI (in step 513). Thereafter, a determination is made whether the electric signal I is less than or equal to a maximum allowable electric signal Io (in step 515). If I is less than or equal to Io, the program goes to the step 527, while if I is greater than Io, I is given Io (in step 517) and the program goes to the step 527. If, in step 511, Tr is less than or equal to Tru, a determination is made whether the torque Tr is less than a desired lower limit torque value TrL or not (in step 519). If Tr is greater than or equal to TrL (if combined with the determination made in the step 511, Tr is greater than or equal to TrL but less than or equal to Tru. That is, the torque Tr is disposed between the upper and lower limit values Tru and TrL.), the step 527 is executed to send out the electric current signal I obtained in the previous routine. If, in step 519, Tr is less than TrL, the force motor electric signal I is decreased by the small value ΔI (in step 521). For preventing the electric current signal I from becoming zero, a determination is made whether I is greater than or equal to zero or not (in step 523). If I is greater than or equal to zero, the program goes directly to the step 527, while if the I is less than zero, the program goes to a step 525 where I is given zero, and then goes to the step 527 where the electric current signal I is sent out. What is done by the execution of the above mentioned steps is to increase the force motor electric signal I if the torque Tr is greater than the upper limit value Tru to decrease the start pressure Ps in order to increase the slip in the clutch to decrease the transmission torque Tr. If the torque Tr is less than the lower limit value TrL, the force motor electric current signal I is decreased in order to decrease the slip in the clutch to increase the transmission torque Tr. Therefore, the torque Tr is maintained between the desired torque upper and lower limit values Tru and TrL. The desired torque is set at a value with which the vehicle can travel at a very low speed (i.e., a creeping travel state). Accordingly, if the engine revolution speed increases from this state, the start pressure Ps is increased, by the action of the starting valve 1116, to a value which is the sum of the oil pressure at idling of the engine and an oil pressure corresponding to an increase in the engine revolution speed, thus firmly engaging the forward clutch 1004 (or the reverse clutch 1024) so as to start the vehicle. With the above mentioned control, stable starting of the vehicle is provided without the occurrence of engine racing nor unintentional starting of the vehicle. This is because the clutch is maintained in such an engaging state as to keep the torque Tr constant irrespective of the variation of the idle speed. In the flow along steps 2100→2102→2104→2106, the force motor electric current signal I is given the predetermined relatively large value I1. That is, the start pressure Ps is decreased if the "N" or "P" position is selected as compared to the case where the other position is selected. Therefore, it takes a time until the clutch is engaged firmly enough to let the vehicle move at a very low speed after the manual valve 1104 is shifted from "N" or "P" to "D" position. Owing to this delay, substantial shocks are avoided upon shifting to "D" position.

According to this second embodiment, the start adjustment valve 1118 is controlled by the electronic control unit 1300 such that the start adjustment pressure varies so as to keep the torque transmitted to the output shaft 1076 substantially constant. If the idle speed of the engine increases, the engine revolution speed oil pressure signal acting upon the starting valve 1116 increases accordingly, but the start adjustment pressure which is opposed to the engine revolution speed oil pressure signal also increases under the command by the electronic control unit 1300. As a result, the start pressure Ps supplied to the clutch is almost unchanged. More specifically, the start pressure Ps drops slightly to offset an increase in the torque resulting from the increase in the engine revolution speed. Therefore, a torque which is constant and great enough to let the vehicle move at a very low speed is always transmitted via the clutch. Since, according to the second embodiment, the clutch is slightly engaged when the engine idles with the vehicle at a standstill, the racing of the engine upon starting of the vehicle is effectively prevented.

Although, in the second embodiment described above, the torque which is transmitted by the clutch before starting the vehicle is set at a value which is capable to move the vehicle at a very low speed, the torque may be set at a value smaller than this value so that the vehicle will not move. In the latter case, it is not necessary to determine a shift position, so that the steps 2100, 2102, 2104 and 2106 shown in FIG. 24 may be removed.

Referring mainly to FIGS. 25A, 25B, 26 and 27, a third embodiment according to the present invention is described.

Figure 27:
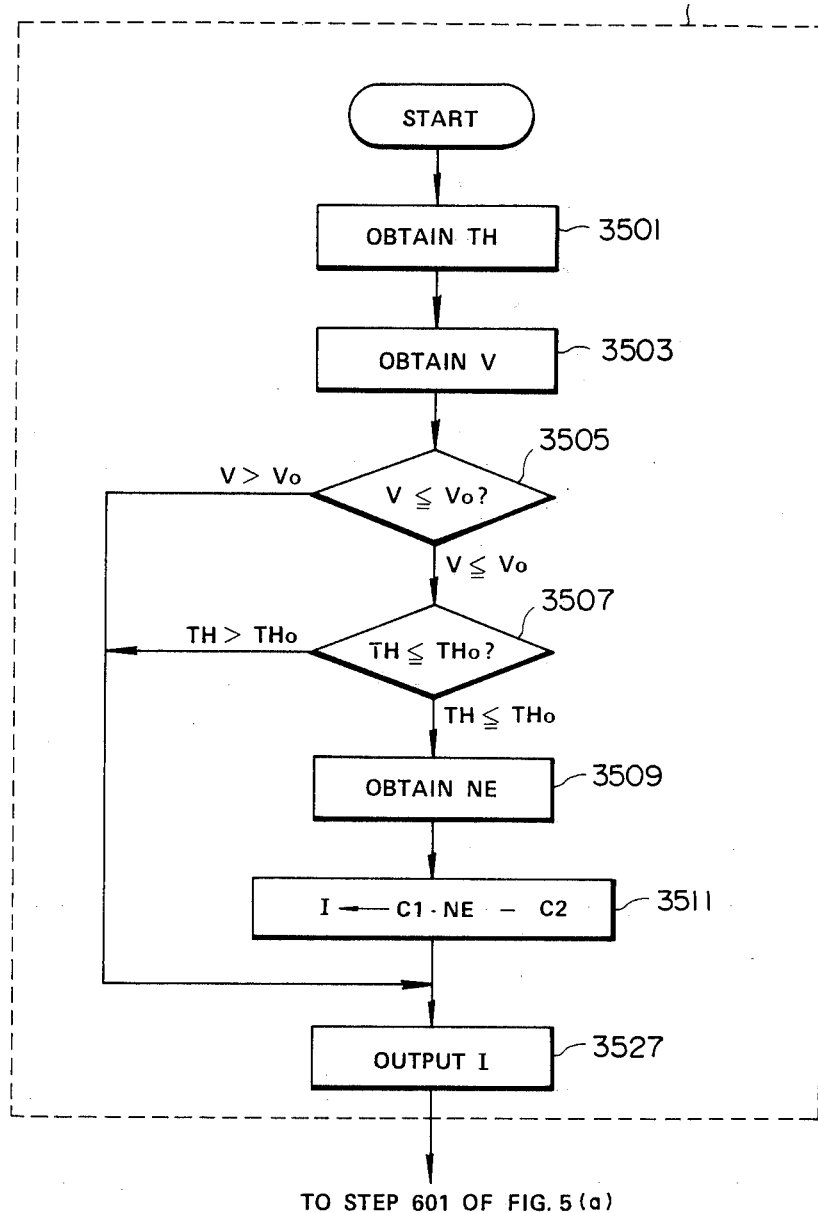
FIG. 27 is a flow chart of a force motor control routine 500B used in the third embodiment.

The third embodiment is different from the first embodiment in that instead of the starting valve 1116, a starting valve 2116 as shown in FIG. 25A is used, the start pressure detecting pressure sensor 321 is not required, and instead of the force motor control routine 500 (see FIG. 4), a force motor control routine 500B as shown in FIG. 27 is used.

Referring to FIGS. 25A and 25B, the starting valve 2116 comprises a valve bore 2204 provided with ports 2204a, 2204b, 2204c, 2204d, 2204e and 2204f, a spool 2206 having thereon lands 2206a, 2206b, 2206c and 2206d (the land 2206a has on the lefthand side a tapered portion), and a spring 2208 biasing the spool 2206 to the left, as viewed in FIG. 25A. The port 2204a communicates with the oil conduit 1140 which connects via an orifice 1210 with an oil conduit 1162 forming the throttle pressure circuit. The port 2204b is drained through an oil conduit 1200 forming a drain circuit. The oil conduit 1200 communicates with a portion between an oil pump 1010 and a strainer 1131. The port 2204c is a drain port, too. The port 2204d is connected via an oil conduit 1212 with a start adjustment valve 1118. The port 2204e communicates via an oil conduit 1190 with a port 1186b of a clutch complete engagement control valve 1108. The port 2204f communicates via an oil conduit 1214 with a pitot tube 1020. That is, an oil pressure signal indicative of a revolution speed of an input shaft 1002 (i.e., an engine revolution speed oil pressure signal) is supplied to the port 2204f. The ports 2204d, 2204e and 2204f have at their inlets orifices 2216, 2218 and 2220, respectively. The starting valve 2116 has a pressure reduction function to generate an oil pressure (start pressure) within the oil conduit 1140 by discharging the oil in the port 2204a toward the port 2204b depending upon the position of the spool 2206. If the spool 2206 is disposed to the left viewing in FIG. 25A, the oil pressure at the port 2204a is relatively high because a clearance passage from the port 2204a to the port 2204b is narrow, while if the spool 2206 has moved to the right, the oil pressure at the port 2204a drops because the clearance passage from the port 2204a to the port 2204b becomes wide and the amount of oil drainage increases. Since the oil conduit 1162 forming the throttle pressure circuit communicates via the orifice 1210 with the oil conduit 1140 forming the start pressure circuit, the throttle pressure in the oil conduit 1162 is not substantially affected even if the oil pressure in the oil conduit 1140 drops. The spool 2206 assumes in the equilibrium state when the sum of a rightwardly directed force by the start pressure in the port 2204a acting on the land 2206a and another rightwardly directed force by the start adjustment pressure in the port 2204d acting on the differential area between the lands 2206b and 2206c is cancelled by the sum of a leftwardly directed force by the drive pulley revolution speed oil pressure signal in the port 2204e acting on the differential area between the lands 2206c and 2206d and another leftwardly directed force by an engine revolution speed oil pressure signal in the port 2204f acting on the 2206d. Thus, the higher the start adjustment pressure in the oil conduit 1212 generated by the start adjustment valve 1118, the lower the start pressure in the oil conduit 1140 becomes, and the higher the engine revolution speed oil pressure signal and/or the drive pulley revolution speed oil pressure signal, the higher the start pressure beomes. Upon starting the vehicle, the rod 1182 of the clutch complete engagement control valve 1108 is disposed at the leftmost position and the oil conduit 1190 is drained so that the drive pulley revolution speed oil pressure signal does not reach the port 2204e of the starting valve 2116. Accordingly, the start pressure is controlled in response to the start adjustment pressure and engine revolution speed oil pressure signal only and thus gradually increases as the engine revolution speed increases after starting operation begins. This start pressure is supplied to the forward clutch 1004 (or the reverse clutch 1024), rendering the clutch to engage gradually, thus permitting the vehicle to start moving smoothly. After the vehicle has started moving, the clutch complete engagement control valve 1108 is switched by the stepper motor 1110, allowing the oil conduit drive pulley revolution speed oil pressure signal to arrive via the oil conduit 1190 at the port 2204e, causing the start pressure to increase rapidly (see FIGS. 5(a) and 5(b)). With this rapid increase in the start pressure, the forward clutch 1004 (or the reverse clutch 1024) is firmly engaged and thus becomes free from a clutch slip.

Referring now to FIG. 27, the force motor control routine 500B is described.

The force motor control routine 500B features in that an electric current I passing through a force motor 1224 of the start adjustment value 1118 is determined by an arithmetic operation of a predetermined equation. Explaining along the steps, the throttle opening degree TH is obtained from a throttle opening degree sensor 303 (in step 3501), and the vehicle speed V is obtained from a vehicle speed sensor 302 (in step 3503). A determination is made in step 3505 whether the vehicle speed V is less than or equal to a predetermined small value Vo. If the vehicle speed V is less than or equal to Vo, a step 3507 is executed wherein a determination is made whether the throttle opening degree TH is less than or equal to a predetermined small value THo. If TH is less than or equal to THo, i.e., a state wherein the engine idles when the vehicle is at a standstill, the program goes to a step 3509 wherein the engine revolution speed NE is obtained from an engine revolution speed sensor 301. If, in step 3505 and/or step 3507, a determination is made that V is greater than Vo or TH is greater than THo, a step 527 is executed wherein the same force motor electric current signal I as in the preceding routine is sent out. After the engine revolution speed NE has been obtained in step 3509, the program goes to a step 3511 wherein the arithmetic operation is made to determine the appropriate force motor electric current signal I. The force motor electric current signal I is given by the following equation;

$$I = C1 \cdot NE - C2 \qquad (1)$$

(The force motor electric current signal I may be determined by a table lock-up of an appropriate map as will be mentioned later.) C1 and C2 are constants which are determined in the manner described later.

With the electric current signal I set as above, the start pressure Ps is kept at a predetermined value which is determined by the spring 2208 as will be described hereinafter.

The equilibrium state of the start valve 2116 can be expressed by the following equation;

$$As \cdot Ps = AE \cdot PE - Ac \cdot Pc + F \qquad (2)$$

where:
As: Pressure acting area of land 2206a
AE: Pressure acting area of land 2206d
Ac: Differential area between lands 2206c and 2206b
Ps: Start pressure
PE: Engine revolution speed oil pressure signal
Pc: Start adjustment pressure
F: Force of spring 2208.
PE and Pc are given by the following equations:

$$PE = a \cdot NE^2 \qquad (3)$$

$$Pc = b \cdot I^2 + cI \qquad (4)$$

(a, b and c are constants)
The before mentioned C1 and C2 are given by the following equations, respectively;

$$C1 = \sqrt{(AE \cdot a)/(Ac \cdot b)} \qquad (5)$$

$$C2 = c/2b \qquad (6)$$

If the above equations (5) and (6) are put into the equation (1), $$I = \sqrt{(AE \cdot a)/(Ac \cdot b)} \cdot NE - c/2b \qquad (7)$$

is given. If this equation (7) is put into the equation (4), $$Pc = b \cdot (NE^2 \cdot (AE \cdot a)/(Ac \cdot b) - c^2/4b^2)$$

is given. Neglecting $c^2/4b^2$, $$Pc = NE^2 \cdot (AE \cdot a \cdot b)/(Ac \cdot b) \qquad (8)$$

is given. Now, if the equations (3) and (8) are put into the equation (2), $$As \cdot Ps = F$$

is given. Thus, $$Ps = F/As \qquad (9)$$

Therefore, the start pressure Ps is a constant value determined by F and As. Preferably, the values F and As are set such that the start pressure Ps is a value at which the clutch is about to egage.

After the electric current signal I has been determined in step 3511 by the arithmetic operation of the equation (1), the program goes to step 3527 wherein the electric current signal I determined as above is sent out.

As a result, when the engine idles with the vehicle at a standstill, the start pressure Ps is always kept at the predetermined value at which the clutch is about to engage, i.e., an oil pressure value above which the clutch starts engaging.

Although, in the above mentioned embodiment, the force motor electric current I is determined by the arithmetic operation of the predetermined equation, it is possible to obtain the appropriate electric current signal I from an appropriate map stored in the ROM 314. In this case the above described neglected value ($c^2/4b^2$) can be taken into account when preparing the data for the map. Thus, the start pressure Ps is kept at the predetermined value with more accuracy. In this case, it is possible, if desired, to design the map so as to slightly increase the start pressure Ps in response to an increase in the idle revolution speed of the engine by deviating the data in the map. With the use of this modified map, the clutch will be slightly engaged when the idle revolution speed is relatively high, thus enabling the vehicle to start moving smoothly.

As will be readily understood from the equation (9), the start pressure Ps is easily adjusted to a desired value by varying the force F of the spring 2208.

Figure 28:
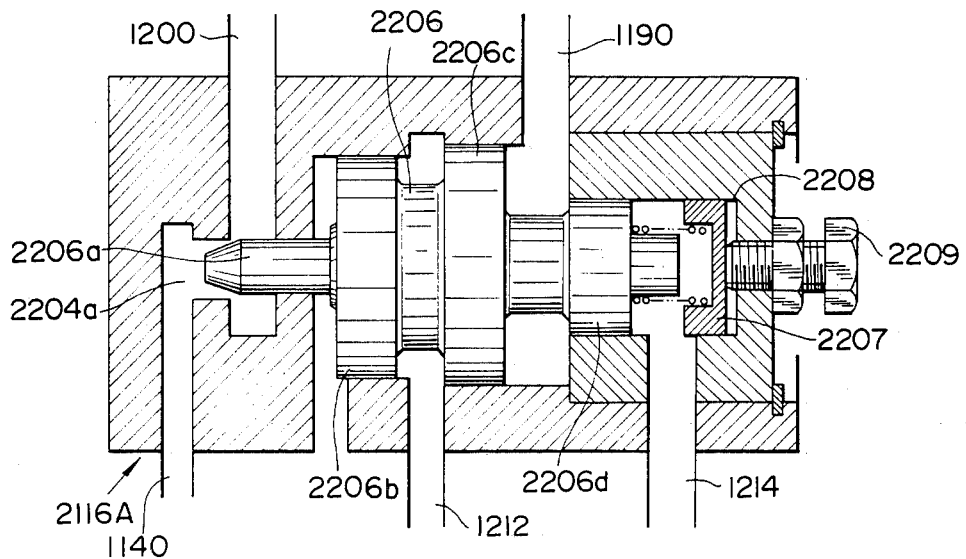
FIGS. 28 and 29 are sectional views of two other forms of a starting valve.

Referring to FIG. 28, another form of a starting valve 2116A is described wherein the spring force F is adjusted easily. This starting valve 2116A features in the provision of a mechanism to adjust the force F of a spring 2208. The adjusting mechanism includes a spring retainer 2207 which supports one end of the spring 2208 and an adjusting bolt 2209. The spring retainer 2207 is slidable to a desired position by turning the adjusting bolt 2209. The remaining structure is similar to the counterpart in the starting valve 2116 shown in FIG. 25A. With this adjustable mechanism, the force of the spring 2208 can be adjusted from the outside, thus making it easy to adjust the start pressure Ps to a desired value.

Figure 29:
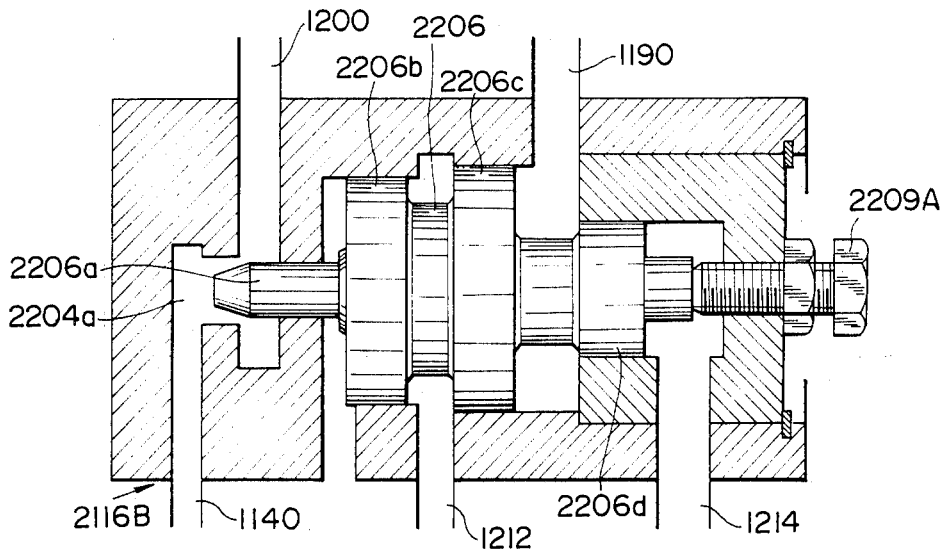

Referring to FIG. 29, a still another form of a starting valve 2116B is described. In this starting valve 2116B, the spring 2208 which has been used in each of the starting valves 2116 and 2116A is not used. An adjusting bolt 2209A is so arranged as to contact the righthand end, as viewed in FIG. 29, of a spool 2206. With the adjusting bolt 2209A, the rightward limit position of the spool 2206 is defined and thus a clearance defined between the lefthand tapered portion of a land 2206a and the adjacent wall of the bore is accurately set at a predetermined value. Therefore, the start pressure when the engine idles with the vehicle at a standstill can be easily and accurately set to a desired predetermined value by turning the bolt 2209A. When this starting valve 2116B is used, constants C1 and C2 of equation (1) the used in a step 351 (see FIG. 27) should be given different values from the values expressed by the equations (5) and (6).

Figure 30:
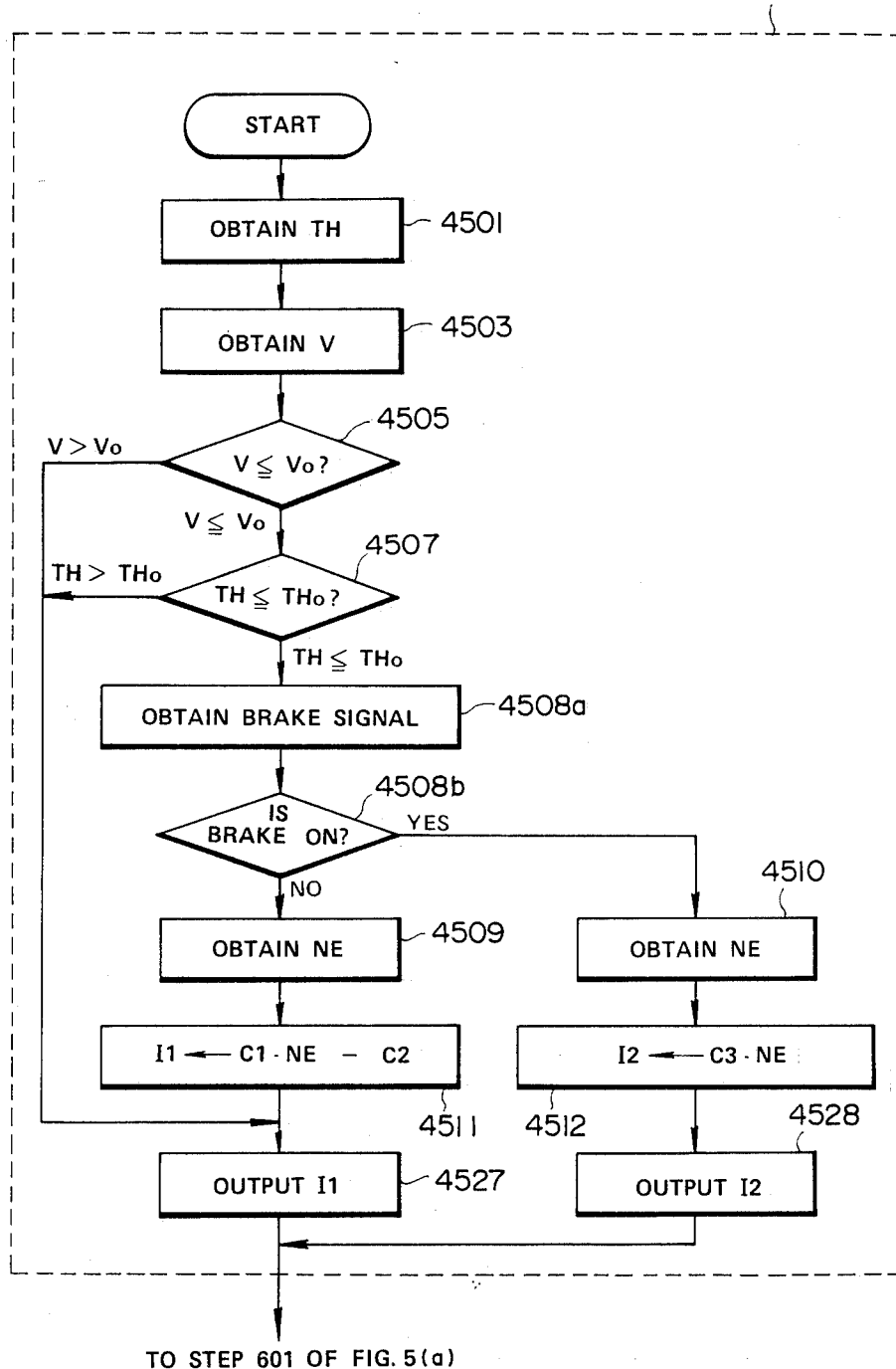
FIG. 30 is a flow chart of a force motor control routine 500C used in a fourth embodiment.

Lastly, referring mainly to FIGS. 30 and 31, a fourth embodiment is described.

This embodiment is substantially similar to the third embodiment described in connection with FIGS. 25A, 25B, 26 and 27, but is different in that instead of the force motor control routine 500B, a force motor control routine 500C as shown in FIG. 30 is used.

Hereinafter the force motor control routine 500C shown in FIG. 30 is described. The control routine 500C is substantially similar to the control routine 500B but is different in that steps are provided to determine whether the brake is applied or not and another electric current signal I2 is determined when the brake is applied. Explaining along steps, the throttle opening degree TH is obtained from a throttle opening degree sensor 303 (in step 4501). The vehicle speed V is obtained from a vehicle speed sensor 302 (in step 4503). A determination is made in step 4505 whether the vehicle speed V is less than or equal to a predetermined small value Vo. If the vehicle speed V is less than or equal to Vo, a step 4507 is executed wherein a determination is made whether the throttle opening degree TH is less than or equal to a predetermined small value THo. If TH is less than or equal to THo, i.e., a state where the engine idles when the vehicle is at a standstill, the program goes to a step 4508*a* wherein a brake signal is obtained from a brake sensor 306. If the foot brake or the parking brake is not used, the program goes to a step 4509, while if it is used, the program goes to a step 4510. If, in step 4505 or step 4507, V is greater than Vo or TH is greater than THo, the program goes to a step 527 where the force motor electric signal I1 as in the preceding routine, i.e., and electric signal I1 appearing right before V becomes greater than Vo or TH becomes greater than THo, is sent out. This electric signal I1 is sent out during each of the following routines as long as V is greater than Vo or TH is greater than THo (a flow from step 4505 or 4507 to step 4527).

In step 4510, the engine revolution speed NE is obtained from the engine revolution speed sensor 301. In the next step 4512, a force motor electric current signal I2 is determined by arithmetic operation of an equation C3 NE. The value C3 is a large constant, and thus I2 is a relatively large value. This causes start adjustment pressure to be elevated. As a result, the start pressure Ps drops and the clutch is completely disengaged. Alternatively, the force motor electric current signal I2 may be determined by any desired manner or arithmetic operation as long as the start pressure Ps becomes a sufficiently low value which allows the the clutch to be released completely. After the step 4512, the program goes to step 4528 where the above mentioned force motor electric current signal I2 is sent out.

If the brake is not applied (step 4508*b*), the engine revolution speed NE is obtained in step 4509, and the program goes to step 4511 where an arithmetic operation of the equation (1) is made to determine the force motor electric current signal I1.

After determining the electric current signal I1, the program goes to step 4527 where the electric current signal I1 is sent out.

As a result of the execution of the flow along the steps 4508*a*→4508*b*→4509→4511→4527, the start pressure Ps is kept at a value at which the forward clutch 1004 (or the reverse clutch 1024) is slightly engaged. Thus, if the engine revolution speed is increased, the start pressure Ps increases and can be expressed as the sum of the above mentioned constant pressure during idling of the engine and an oil pressure variable corresponding to the engine revolution speed, thus allowing the forward clutch 1004 (or the reverse clutch 1024) to be engaged for starting the vehicle. Therefore, a stable starting operation of the vehicle without engine racing nor unintentional starting is secured irrespective of variation in idle revolution speed of the engine. This is because the start pressure Ps is always maintained, regardless of the variation in idle speed, at the pressure at which the clutch is slightly engaged.

As a result of the execution of the flow along the steps 4508*a*→4508*b*→4510→4512→4527, the clutch is completely disengaged as long as the brake is applied or used. Thus, a torque transmitted by the clutch is zero and the engine is subject to no or little load.

If the starting operation of the vehicle begins with the brake being applied, the program goes from the step 4507 to step 4527, and the same force motor electric current signal I1 as that when the brake is not used is sent out. Thus, the start pressure Ps is elavated immediately to the value at which the clutch is slightly engaged.

Although in the described embodiment, the start pressure Ps drops when the brake is applied or used to completely release the engagement of the clutch, it is apparently possible to modify so as to allow the clutch to be slightly engaged even when the brake is used. This modification is made by removing in FIG. 30 steps 4508*a*, 4508*b*, 4510, 4512 and 4528.

What is claimed is:

1. A control system for a hydraulic automatic clutch of a vehicle having an engine, comprising:
    a hydraulic clutch;
    an engine revolution means for generating an engine revolution fluid pressure signal indicative of a revolution speed of the engine;
    a start adjustment valve means for generating a start adjustment fluid pressure signal in response to an electric signal;
    a starting valve means coupled with said engine revolution means and said start adjustment valve means for generating a start fluid pressure in response to said engine revolution fluid pressure signal and said start adjustment fluid pressure signal, said start fluid pressure being supplied to said clutch to engage same; and
    an electronic control unit means for controlling said electric signal to keep said clutch in a predetermined state regardless of a variation in said engine revolution fluid pressure signal when the engine idles with the vehicle at a standstill.

2. A control system as claimed in claim 1, wherein said start fluid pressure varies in proportion to said engine revolution fluid pressure signal, but in inverse proportion to said start adjustment fluid pressure signal.

3. A control system as claimed in claim 2, including a pressure sensor means for generating a sensor electric signal indicative of said start fluid pressure, and wherein said electronic control unit means is coupled with said pressure sensor means and controls said electric signal supplied to said start adjustment valve means so as to keep said start fluid pressure constant.

4. A control system as claimed in claim 2, including a torque sensor means for generating a sensor electric signal indicative of a traction torque for the vehicle, and wherein said electronic control unit means is coupled with said torque sensor means and controls said electric signal supplied to said start adjustment valve means so as to keep the traction torque at a predetermined value.

5. A control system as claimed in claim 4, wherein said predetermined value at which the traction torque is kept is a value with which the vehicle can move at a predetermined speed.

6. A control system as claimed in claim 4, wherein said predetermined value at which the traction force is kept is a value which is lower than a value with which the vehicle can move.

7. A control system as claimed in claim 2, including means for generating a throttle fluid pressure indicative of a load on the engine and means defining a fluid conduit which has one end connected with said throttle fluid pressure generating means to receive said throttle fluid pressure and the opposite end connectable with said clutch, and wherein said starting valve means includes a drain passage communicating with said fluid conduit and a spool having a conical valve section extending into said drain passage to define a variable opening area.

8. A control system as claimed in claim 7, wherein said starting valve means includes a spring acting on said spool to bias same in one direction to increase said variable opening area, said spool has a first pressure acting area exposed to said engine revolution fluid pressure signal to be urged to move against said spring in the opposite direction to decrease said variable opening area, said spool has a second pressure acting area exposed to said start adjustment fluid pressure signal to be urged to move in said one direction, and said spool has a third pressure acting area exposed to said start fluid pressure to be urged to move in said one direction.

9. A control system as claimed in claim 7, including means for generating an engine revolution electric signal indicative of the engine revolution speed, and wherein said electronic control unit means is coupled with said engine revolution electric signal generating means and generates the electric signal to be supplied to said start adjustment valve means which has a predetermined relation with said engine revolution electric signal.

10. A control system as claimed in claim 9, wherein said spool has a first pressure acting area exposed to said engine revolution fluid pressure signal to be urged to move in one direction to decrease said variable opening area, said spool has a second pressure acting area exposed to said start adjustment fluid pressure signal to be urged to move in the opposite direction to increase said variable opening area, and said starting valve includes an adjustable bolt with contacts with an exial end of said spool to define a limit of an increase is said variable opening area.

11. A control system as claimed in claim 2, wherein, after the vehicle has started moving off from the standstill, said electronic control unit means holds said electric signal at that value which was supplied to said start adjustment immediately before the vehicle has started moving off from the standstill.

12. A control system as claimed in claim 11, wherein said predetermined state is a state wherein said clutch is slightly engaged.

13. A control system as claimed in claim 2, including a brake sensor means for generating a brake signal indicative of the use of a foot brake and/or a parking brake, wherein said electronic control unit means controls said electric signal to keep said clutch in said predetermined state wherein said clutch is slightly engaged when the engine idles with the vehicle at standstill and when said brake signal is absent, and said electronic control unit means controls said electric signal to keep said clutch is a second predetermined state wherein said clutch is completely disengaged when the engine idles with the vehicle at standstill and when said brake signal is present.

* * * * *